US009459898B2

(12) United States Patent
Watanabe et al.

(10) Patent No.: US 9,459,898 B2
(45) Date of Patent: Oct. 4, 2016

(54) VIRTUAL SERVER PROCESSING CONTROL METHOD, SYSTEM, AND VIRTUAL SERVER PROCESSING CONTROL MANAGEMENT SERVER

(75) Inventors: Kentaro Watanabe, Tokyo (JP); Yoshifumi Takamoto, Tokyo (JP); Takashi Tameshige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 356 days.

(21) Appl. No.: 14/349,185

(22) PCT Filed: Oct. 6, 2011

(86) PCT No.: PCT/JP2011/073116
§ 371 (c)(1),
(2), (4) Date: Apr. 2, 2014

(87) PCT Pub. No.: WO2013/051136
PCT Pub. Date: Apr. 11, 2013

(65) Prior Publication Data
US 2014/0259014 A1    Sep. 11, 2014

(51) Int. Cl.
*G06F 9/455* (2006.01)
*G06F 9/46* (2006.01)
(Continued)

(52) U.S. Cl.
CPC ....... *G06F 9/45533* (2013.01); *G06F 9/45558* (2013.01); *G06F 9/5077* (2013.01);
(Continued)

(58) Field of Classification Search
CPC ............. G06F 2201/815; G06F 2209/5012; G06F 2209/45583; G06F 2209/4557; G06F 12/1408; G06F 12/08; G06F 12/06; G06F 9/5016; G06F 9/5077; G06F 9/45533; G06F 9/45558; G06F 9/4856; G06F 9/30003; G06F 9/342
See application file for complete search history.

(56) References Cited

U.S. PATENT DOCUMENTS 8,209,683 B2 * 6/2012 Austen ................ G06F 11/0757
714/1
8,458,717 B1 * 6/2013 Keagy ....................... G06F 8/63
718/104

(Continued)

FOREIGN PATENT DOCUMENTS

JP    2007-316724 A    12/2007
JP    2009-230655 A    10/2009

(Continued)

OTHER PUBLICATIONS

Gregor von Laszewski et al., Power-Aware Scheduling of Virtual Machines in DVFS-enabled Clusters, 2009 IEEE, [Retrieved on Mar. 7, 2016]. Retrieved from the internet: <URL: http://ieeexplore.ieee.org/stamp/stamp.jsp?tp=&arnumber=5289182> 10 Pages (1-10).*

(Continued)

*Primary Examiner* — Thuy Dao
*Assistant Examiner* — Anibal Rivera
(74) *Attorney, Agent, or Firm* — Volpe and Koenig, P.C.

(57) ABSTRACT

Each of hypervisors operates on one of physical servers, and a virtual server operates in accordance with a file image on one of data stores. A management server, when being instructed to execute a task that is configured by a series of steps for a hypervisor on the physical server, gives an instruction for changing the execution place of a step to a temporary execution place and executing the task in a case where there is no restriction on the execution place of the step and instructs a default hypervisor to execute the task in a case where there is a restriction on the execution place of the step.

10 Claims, 17 Drawing Sheets

| INSTANCE | OPERATION TYPE | SIMULTANEOUS EXECUTION NUMBER | MAXIMUM SIMULTANEOUS EXECUTION NUMBER |
|---|---|---|---|
| HYPERVISOR A | PROVISIONING | 4 | 4 |
| HYPERVISOR B | PROVISIONING | 0 | 4 |
| HYPERVISOR C | PROVISIONING | 0 | 4 |
| DATA STORE A | PROVISIONING | 3 | 4 |
| DATA STORE B | PROVISIONING | 0 | 4 |
| DATA STORE C | PROVISIONING | 0 | 4 |
| HYPERVISOR A | POWER CONTROL | 1 | 4 |
| HYPERVISOR A | LIVE MIGRATION | 1 | 8 |
| HYPERVISOR A | STORAGE MIGRATION | 1 | 2 |

(51) Int. Cl.
*G06F 11/20* (2006.01)
*G06F 9/50* (2006.01)
*G06F 11/14* (2006.01)
*G06F 9/48* (2006.01)

(52) U.S. Cl.
CPC ......... *G06F11/2097* (2013.01); *G06F 9/4856* (2013.01); *G06F 11/1453* (2013.01); *G06F 2009/45595* (2013.01)

(56) References Cited

U.S. PATENT DOCUMENTS

| | | | | |
|---|---|---|---|---|
| 2005/0120160 | A1* | 6/2005 | Plouffe | G06F 9/45537 711/1 |
| 2005/0278722 | A1* | 12/2005 | Armstrong | G06F 9/5077 718/104 |
| 2006/0048160 | A1* | 3/2006 | Olszewski | G06F 9/5083 718/105 |
| 2007/0028239 | A1* | 2/2007 | Dyck | G06F 9/5088 718/1 |
| 2007/0276897 | A1* | 11/2007 | Tameshige | G06F 8/61 709/201 |
| 2007/0299906 | A1* | 12/2007 | Bose | H04L 41/0813 709/202 |
| 2009/0007112 | A1* | 1/2009 | Moriki | G06F 9/45545 718/1 |
| 2009/0055830 | A1* | 2/2009 | Gusler | G06F 9/5061 718/104 |
| 2009/0198862 | A1* | 8/2009 | Okitsu | G06F 9/5088 710/316 |
| 2009/0198891 | A1* | 8/2009 | Arimilli | G06F 12/0815 711/118 |
| 2009/0199194 | A1* | 8/2009 | Arimilli | G06F 9/468 718/104 |
| 2009/0199195 | A1* | 8/2009 | Arimilli | G06F 9/544 718/104 |
| 2009/0199200 | A1* | 8/2009 | Arimilli | G06F 12/0284 718/105 |
| 2009/0235249 | A1* | 9/2009 | Kobayashi | G06F 11/1497 718/1 |
| 2009/0248950 | A1* | 10/2009 | Tamaki | G06F 21/6227 711/6 |
| 2009/0259737 | A1 | 10/2009 | Aikoh et al. | |
| 2009/0307713 | A1* | 12/2009 | Anderson | G06F 11/0712 719/313 |
| 2010/0030877 | A1 | 2/2010 | Yanagisawa | |
| 2010/0031258 | A1* | 2/2010 | Takano | G06F 9/4856 718/1 |
| 2010/0058342 | A1 | 3/2010 | Machida | |
| 2010/0070725 | A1* | 3/2010 | Prahlad | G06F 11/1453 711/162 |
| 2010/0083252 | A1* | 4/2010 | Eide | G06F 9/45558 718/100 |
| 2010/0138831 | A1* | 6/2010 | Inoue | G06F 9/544 718/1 |
| 2010/0162112 | A1* | 6/2010 | Watanabe | G06F 11/3414 715/704 |
| 2010/0218183 | A1* | 8/2010 | Wang | G06F 1/3228 718/1 |
| 2010/0274984 | A1* | 10/2010 | Inomata | G06F 3/0605 711/162 |
| 2010/0299666 | A1* | 11/2010 | Agbaria | G06F 9/4856 718/1 |
| 2010/0306463 | A1* | 12/2010 | Nakamura | G06F 12/0842 711/113 |
| 2010/0325634 | A1* | 12/2010 | Ichikawa | G06F 9/4856 718/103 |
| 2011/0022574 | A1* | 1/2011 | Hansen | G06F 11/2097 718/1 |
| 2011/0078395 | A1* | 3/2011 | Okada | G06F 11/3442 711/162 |
| 2011/0126203 | A1* | 5/2011 | Fahrig | G06F 9/5077 718/102 |
| 2011/0289204 | A1* | 11/2011 | Hansson | G06F 9/5077 709/224 |
| 2011/0321045 | A1* | 12/2011 | Takemura | G06F 9/5077 718/1 |
| 2012/0066684 | A1* | 3/2012 | Takami | G06F 9/5083 718/102 |
| 2012/0096461 | A1* | 4/2012 | Goswami | G06F 9/45558 718/1 |
| 2012/0117567 | A1* | 5/2012 | Amano | G06F 9/5083 718/1 |
| 2012/0131379 | A1* | 5/2012 | Tameshige | G06F 9/5077 714/4.11 |
| 2013/0055245 | A1* | 2/2013 | Tsirkin | G06F 9/545 718/1 |
| 2013/0073778 | A1* | 3/2013 | Hunter | G06F 9/45533 711/6 |

FOREIGN PATENT DOCUMENTS

| | | |
|---|---|---|
| JP | 2009-252204 A | 10/2009 |
| WO | 2008084826 A1 | 7/2008 |
| WO | 2008/102739 A1 | 8/2008 |

OTHER PUBLICATIONS

Rajkumar Buyya et al., InterCloud: Utility-Oriented Federation of Cloud Computing Environments for Scaling of Application Services, 2010, [Retrieved on Mar. 7, 2016]. Retrieved from the internet: <URL: http://download.springer.com/static/pdf> 14 Pages (13-31).*

* cited by examiner

FIG. 6

| TASK # | TEMPORARY CONFIGURATION | FINAL CONFIGURATION |
|---|---|---|
| TASK 3 | HYPERVISOR C | HYPERVISOR A |
| TASK 3 | PORT GROUP D | PORT GROUP A |
| TASK 3 | PORT GROUP E | PORT GROUP B |
| TASK 3 | DATA STORE A | DATA STORE A |

FIG. 7

| INSTANCE | OPERATION TYPE | SIMULTANEOUS EXECUTION NUMBER | MAXIMUM SIMULTANEOUS EXECUTION NUMBER |
|---|---|---|---|
| HYPERVISOR A | PROVISIONING | 4 | 4 |
| HYPERVISOR B | PROVISIONING | 0 | 4 |
| HYPERVISOR C | PROVISIONING | 0 | 4 |
| DATA STORE A | PROVISIONING | 3 | 4 |
| DATA STORE B | PROVISIONING | 0 | 4 |
| DATA STORE C | PROVISIONING | 0 | 4 |
| HYPERVISOR A | POWER CONTROL | 1 | 4 |
| HYPERVISOR A | LIVE MIGRATION | 1 | 8 |
| HYPERVISOR A | STORAGE MIGRATION | 1 | 2 |

| HYPERVISOR<br>23a | TASK EXECUTION-<br>DEDICATED FLAG<br>23b | DATA STORE<br>23c | VIRTUAL SERVER<br>23d | PORT GROUP<br>23e |
|---|---|---|---|---|
| HYPERVISOR A | False | DATA STORE A,<br>DATA STORE B | VIRTUAL SERVER A,<br>VIRTUAL SERVER B,<br>VIRTUAL SERVER C,<br>VIRTUAL SERVER D,<br>VIRTUAL SERVER E | PORT GROUP A,<br>PORT GROUP B |
| HYPERVISOR B | False | DATA STORE C | VIRTUAL SERVER F | PORT GROUP C |
| HYPERVISOR C | True | DATA STORE A,<br>DATA STORE B,<br>DATA STORE C | VIRTUAL SERVER G | PORT GROUP D,<br>PORT GROUP E |

| DATA STORE | VIRTUAL SERVER |
|---|---|
| DATA STORE A | VIRTUAL SERVER A<br>VIRTUAL SERVER G |
| DATA STORE B | VIRTUAL SERVER B<br>VIRTUAL SERVER C<br>VIRTUAL SERVER D<br>VIRTUAL SERVER E |
| DATA STORE C | VIRTUAL SERVER F |

| HYPERVISOR | MANAGEMENT AUTHORITY |
|---|---|
| HYPERVISOR A | AUTHORITY FOR ACCESSING DATA STORES A AND B |
| HYPERVISOR B | AUTHORITY FOR ACCESSING DATA STORE C |
| HYPERVISOR C | AUTHORITY FOR ACCESSING DATA STORES A, B, AND C |

| OPERATION | INSTANCE | ESTIMATED PROCESSING TIME |
|---|---|---|
| DEPLOYMENT | VIRTUAL SERVER TEMPLATE A | 30 MINUTES |
| DEPLOYMENT | VIRTUAL SERVER TEMPLATE B | 20 MINUTES |
| DEPLOYMENT | VIRTUAL SERVER TEMPLATE C | 40 MINUTES |

FIG. 13

| TIME | INSTANCE | METRIC | METRIC VALUE |
|---|---|---|---|
| 2011/7/31 10:00 | HYPERVISOR A | TOTAL CPU ALLOCATION INSUFFICIENT AMOUNT (CPU ready) | 300MHz |
| 2011/7/31 10:00 | HYPERVISOR B | TOTAL CPU ALLOCATION INSUFFICIENT AMOUNT (CPU ready) | 0MHz |
| 2011/7/31 10:00 | HYPERVISOR C | TOTAL CPU ALLOCATION INSUFFICIENT AMOUNT (CPU ready) | 0MHz |
| 2011/7/31 10:00 | DATA STORE A | TOTAL I/O STANDBY TIME | $10\mu s$ |
| 2011/7/31 10:00 | DATA STORE B | TOTAL I/O STANDBY TIME | $0\mu s$ |
| 2011/7/31 10:00 | DATA STORE C | TOTAL I/O STANDBY TIME | $0\mu s$ |

FIG. 14

| 27a | 27b | 27c | 27d | 27e |
|---|---|---|---|---|
| SCENARIO # | TYPE | ARGUMENT | STEP | NETWORK |
| SCENARIO 1 | DEPLOYMENT | HYPERVISOR x, DATA STORE x, TEMPLATE x, PORT GROUP x | 1: GENERATE PORT GROUPS x IN HYPERVISOR x | False |
| | | | 2: GENERATE VIRTUAL SERVER FROM TEMPLATE x IN HYPERVISOR x AND DATA STORE x | False |
| | | | 3: HYPERVISOR x CONNECTS GENERATED VIRTUAL SERVER TO PORT GROUP x | False |
| | | | 4: HYPERVISOR x CUSTOMIZES GUEST OS OF GENERATED VIRTUAL SERVER | False |
| | | | 5: HYPERVISOR x CUSTOMIZES APPLICATION OF GENERATED VIRTUAL SERVER | True |
| | | | 6: HYPERVISOR x CHECKS COMMUNICATION OF GENERATED VIRTUAL SERVER | True |

| TYPE (27f) | CONDITION (27g) | ARGUMENT (27h) | STEP (27i) |
|---|---|---|---|
| DEPLOYMENT | DATA STORE p = DATA STORE q | FINAL EXECUTION PLACE HYPERVISOR p, DATA STORE p, PORT GROUP p, TEMPORARY EXECUTION PLACE HYPERVISOR q, DATA STORE q, PORT GROUP q, | GENERATE PORT GROUP p IN HYPERVISOR p |
| | | | PERFORM LIVE MIGRATION OF VIRTUAL SERVER GENERATED IN HYPERVISOR q TO HYPERVISOR p |
| | | | CONNECT GENERATED VIRTUAL SERVER TO PORT GROUP p |
| DEPLOYMENT | DATA STORE p ≠ DATA STORE q | FINAL EXECUTION PLACE HYPERVISOR p, DATA STORE p, PORT GROUP p, TEMPORARY EXECUTION PLACE HYPERVISOR q, DATA STORE q, PORT GROUP q, | GENERATE PORT GROUP p IN HYPERVISOR p |
| | | | PERFORM LIVE MIGRATION OF VIRTUAL SERVER GENERATED IN HYPERVISOR q TO HYPERVISOR p |
| | | | PERFORM STORAGE MIGRATION OF VIRTUAL SERVER GENERATED IN DATA STORE q TO DATA STORE p |
| | | | CONNECT GENERATED VIRTUAL SERVER TO PORT GROUP p |

| TASK # | SCENARIO # | ARGUMENT | STEP | NETWORK |
|---|---|---|---|---|
| TASK 3 | SCENARIO 1 | TEMPLATE A, HYPERVISOR A, DATA STORE A, PORT GROUPS A AND B | 1: GENERATE PORT GROUPS D AND E IN HYPERVISOR C | False |
| | | | 2: GENERATE VIRTUAL SERVER FROM TEMPLATE A IN HYPERVISOR C AND DATA STORE A | False |
| | | | 3: HYPERVISOR C CONNECTS GENERATED VIRTUAL SERVER TO PORT GROUPS D AND E | False |
| | | | 4: HYPERVISOR C CUSTOMIZES GUEST OS OF GENERATED VIRTUAL SERVER | False |
| | | | 5: GENERATE PORT GROUPS A AND B IN HYPERVISOR A | — |
| | | | 6: PERFORM LIVE MIGRATION OF GENERATED VIRTUAL SERVER TO HYPERVISOR A | — |
| | | | 7: CONNECT GENERATED VIRTUAL SERVER CONNECTED TO PORT GROUPS D AND E TO PORT GROUPS A AND B | — |
| | | | 8: HYPERVISOR A CUSTOMIZES APPLICATION OF GENERATED VIRTUAL SERVER | True |
| | | | 9: HYPERVISOR A CHECKS COMMUNICATION OF GENERATED VIRTUAL SERVER | True |

| TYPE | CONDITION | ARGUMENT | STEP |
|---|---|---|---|
| DEPLOYMENT | DATA STORE p = DATA STORE q | FINAL EXECUTION PLACE HYPERVISOR p, DATA STORE p, PORT GROUP p, | GENERATE PORT GROUP p IN HYPERVISOR p |
| | | | GENERATE SECOND VIRTUAL SERVER FROM TEMPLATE p IN HYPERVISOR p AND DATA STORE p |
| | | | SWITCH TO DISK FILE OF SECOND VIRTUAL SERVER AND SWITCH TO DISK IMAGE FILE OF GENERATED VIRTUAL SERVER |
| DEPLOYMENT | DATA STORE p ≠ DATA STORE q | TEMPORARY EXECUTION PLACE HYPERVISOR q, DATA STORE q, PORT GROUP q, | GENERATE PORT GROUP p IN HYPERVISOR p |
| | | FINAL EXECUTION PLACE HYPERVISOR p, DATA STORE p, PORT GROUP p, | PERFORM LIVE MIGRATION OF VIRTUAL SERVER GENERATED IN HYPERVISOR q TO HYPERVISOR p |
| | | TEMPORARY EXECUTION PLACE HYPERVISOR q, DATA STORE q, PORT GROUP q, | PERFORM STORAGE MIGRATION OF VIRTUAL SERVER GENERATED IN DATA STORE q TO DATA STORE p |
| | | | CONNECT GENERATED VIRTUAL SERVER TO PORT GROUP p |

VIRTUAL SERVER PROCESSING CONTROL METHOD, SYSTEM, AND VIRTUAL SERVER PROCESSING CONTROL MANAGEMENT SERVER

BACKGROUND OF THE INVENTION

1. Field of the Invention

The present invention relates to a method of controlling a resource managing operation relating to a virtual server.

2. Description of the Related Art

It is necessary for an information technology (IT) system operating at a company data center to quickly respond to a business request from a company in a flexible manner.

In accordance with a change in business requests and an increase in the load in recent years, a use model capable of dynamically reinforcing IT infra resources appears. In addition, a use model appears in which IT infra resources present for each division are integrated at a data center, and the IT infra resources of the data center are rented to each division by the hour. Such a use model is called as cloud computing or an infrastructure as a service (IaaS).

In order to realize such a use form, resource management software supports the life-cycle management of the operation of IT infra resources inside the data center. The resource management software supplies resources, deploys computation environments of server resources, network resources, storage resources, and the like to resources, controls the computation environments, and collects such resources in a case where the environment is not necessary.

For example, a deployment process according to conventional resource management software is as below. There are a process of generating a virtual network for a virtual switch on a deployment destination hypervisor, a process of deploying a virtual server at the deployment destination hypervisor and a deployment destination data store, a process of connecting the virtual server to the virtual network, and a customization process in which, after the virtual server is started up, various settings such as an IP address and a host name are changed for a guest OS or an application operating on the virtual server in accordance with individual environments.

Inside a data center, the deployment process of virtual servers is frequently generated, and, particularly, in a huge data center that manages a large scale of management targets, there are cases where many resource change requests (a deployment process, a power control process, and the like) are generated at the same time.

In JP-2009-230655-A, an invention capable of increasing the speed of deployment by minimizing the number of deployments by controlling the storage has been disclosed.

According to a conventional technology, when a deployment process of a virtual server or the like is performed, a management server uses virtual server sharing resources on a hypervisor. Accordingly, when the management server performs multiple process requests for the deployment process of a virtual server and the like, the virtual server sharing resources on the hypervisor are depleted. Accordingly, the throughput of a process request for the deployment process or the like is not raised, and there is concern that a total processing time increases.

Thus, an object of the present invention is to shorten the total processing time for multiple process requests for a virtual server.

SUMMARY OF THE INVENTION

In order to solve the above-described problems and achieve the object of the present invention, the following configurations are employed.

Accordingly, the present invention is a method of processing and controlling a virtual server that is performed by a management server for a hypervisor that can operate a virtual server, wherein the hypervisor operates on one physical server, the virtual server operates in accordance with a file image on one data store, and the management server, when being instructed to execute a task that is configured by a series of steps for a predetermined execution place, gives an instruction for changing the execution place of the steps to a temporary execution place and executing the task and, after the execution at the temporary execution place, causes the virtual server to transit from the temporary execution place to the predetermined execution place, and gives an instruction for continuously executing the task at the predetermined execution place.

The other means will be described in embodiments of the invention.

According to the present invention, a total processing time for multiple process requests for a virtual server can be shortened.

BRIEF DESCRIPTION OF THE DRAWINGS

FIG. 6 is a diagram that illustrates an example of a correspondence table according to the first embodiment;

FIG. 7 is a diagram that illustrates an example of a simultaneous execution number table according to the first embodiment;

FIG. 8 is a diagram that illustrates an example of a configuration table according to the first embodiment;

FIG. 10 is a diagram that illustrates an example of configuration information of a data store according to the first embodiment;

FIG. 11 is a diagram that illustrates an example of a management table of hypervisors according to the first embodiment;

FIG. 12 is a diagram that illustrates an example of a time table according to the first embodiment;

FIG. 13 is a diagram that illustrates an example of a performance table according to the first embodiment;

FIG. 14 is a diagram that illustrates an example of a scenario table according to the first embodiment;

FIG. 15 is a diagram that illustrates an example of an additional scenario table according to the first embodiment;

FIG. 16 is a diagram that illustrates an example of a task table according to the first embodiment;

FIG. 20 is a diagram that illustrates an example of an additional scenario table according to a second embodiment.

DESCRIPTION OF THE PREFERRED EMBODIMENTS

Hereinafter, embodiments of the present invention will be described in detail with reference to the drawings.

Configuration of First Embodiment

Figure 1:
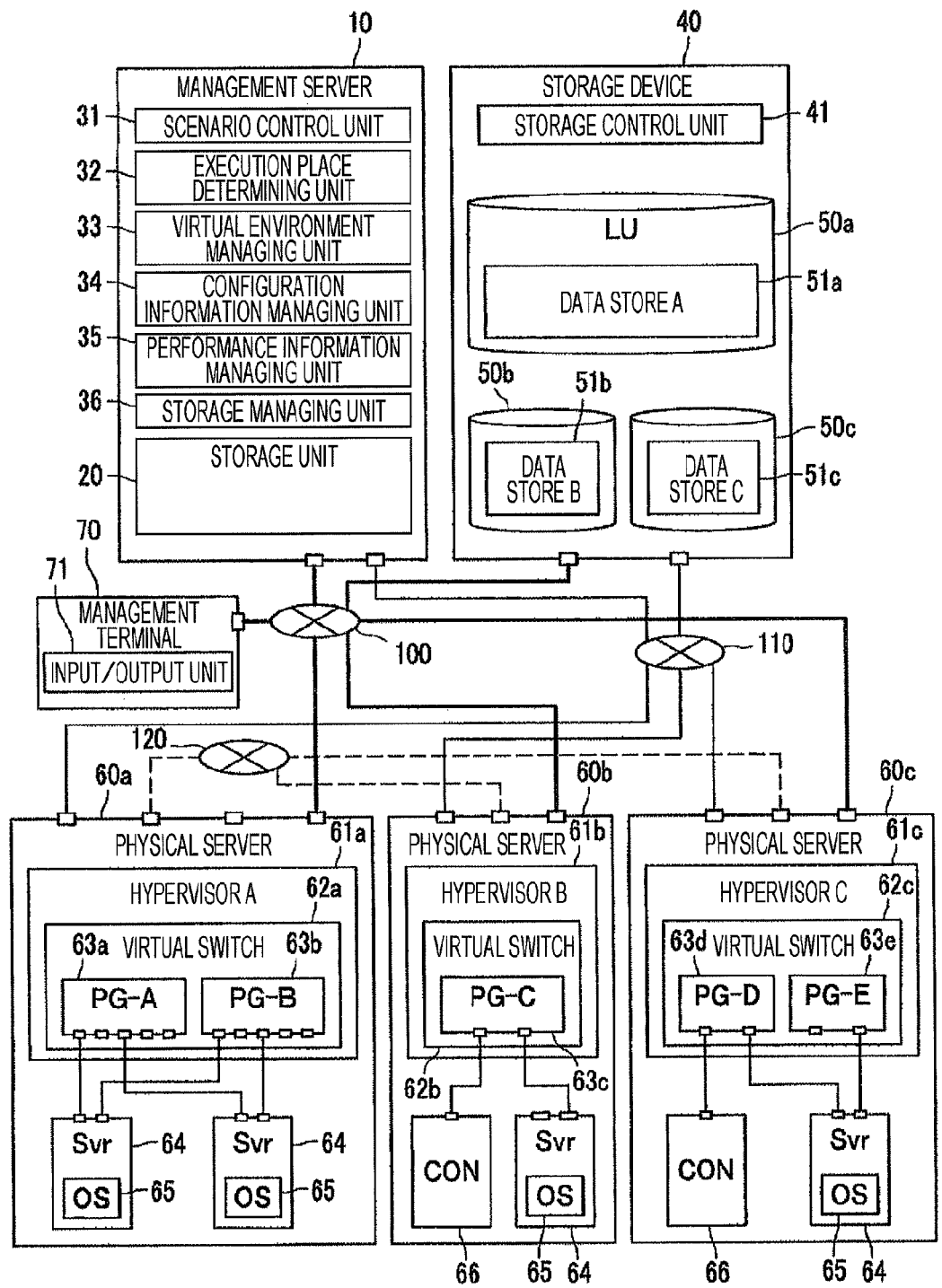
FIG. 1 is a diagram that illustrates the configuration of a management system according to a first embodiment.

FIG. 1 is a diagram that illustrates the configuration of a management system according to a first embodiment.

The management system is equipped with: a management server 10; physical servers 60a, 60b, and 60c; a storage device 40; and a management terminal 70. The management server 10, the physical servers 60a, 60b, and 60c, the storage device 40, and the management terminal 70 are interconnected through a management network 100. In addition, the management server 10, the physical servers 60a, 60b, and 60c, and the storage device 40 are interconnected through a storage network 110. The physical servers 60a, 60b, and 60c are interconnected through a business network 120. Here, the management system is merely an example, and thus, the number of the physical servers is not limited to three, and an arbitrary number of the physical servers may be deployed.

The management server 10 is equipped with: a storage unit 20; a scenario control unit 31; an execution place determining unit 32; a virtual environment managing unit 33; a configuration information managing unit 34; a performance information managing unit 35; and a storage managing unit 36. A detailed logical structure of the management server 10 will be described with reference to FIG. 2 to be described later.

The storage device 40 is an external storage device that stores data. The storage device 40 includes a storage control unit 41 and, for example, logical units 50a, 50b, and 50c. In the following drawings, the logical units 50a, 50b, and 50c may be denoted by "LU". The logical unit 50a includes a data store "A" 51a. The logical unit 50b includes a data store "B" 51b. The logical unit 50c includes a data store "C" 51c. Here, the number of the logical units is not limited to three, but an arbitrary number of logical units may be deployed.

The detailed logical structure of the storage device 40 will be described with reference to FIG. 3 to be described later.

The management terminal 70 includes an input/output unit 71. For example, the input/output unit 71 represents a keyboard, a mouse, and a display. The management terminal 70 receives an input from a supervisor using the input/output unit 71 and transmits input information to the management server 10 through the management network 100. In addition, the management terminal 70 receives information from the management server 10 through the management network 100 and outputs the received information to the display of the input/output unit 71 or the like.

The physical servers 60a to 60c are physical calculators. Each of the physical servers 60a to 60c is one of nodes that may be management targets of the management server 10.

In the physical server 60a, a hypervisor "A" 61a is operated. Two virtual servers 64 are operated by this hypervisor "A" 61a. A guest OS 65 is installed to the virtual server 64. In addition, in the drawings described below, there are cases where the virtual server 64 is denoted as "Svr", and the guest OS 65 is denoted as "OS".

In the physical server 60b, a hypervisor "B" 61b is operated. One virtual server 64 and a console 66 are operated by this hypervisor "B" 61b. In the drawings described below, there are cases where the console 66 is denoted as "CON".

In the physical server 60c, a hypervisor "C" 61c is operated. One virtual server 64 and a console 66 are operated by this hypervisor "C" 61c.

The virtual server 64 is a calculator environment in which a calculator is virtually simulated. The virtual server 64 is an environment that is acquired by dividing computation resources of the physical server 60a in a physical or logical manner using the hypervisor "A" 61a to be described later or the like. The virtual server 64 is also called as a so-called virtual machine (VM), a physical partitioning (PPAR), or a logical partitioning (LPAR). The virtual server 64 is one of nodes that can be management targets of the management server 10.

Each virtual server 64 includes the guest OS 65. The guest OS 65 is a general operating system and, for example, is Windows (registered trademark), Linux (registered trademark), HP-UX (registered trademark), Solalis (registered trademark), VOS3 (registered trademark), z/OS (registered trademark), or the like. Here, the guest OS 65 is one of the nodes that can be the management targets of the management server 10.

The hypervisor "A" 61a is virtualization software or a virtualization mechanism that operates on the physical server 60a, divides resources such as a CPU (not illustrated in the figure), a main storage device (not illustrated in the figure), and the like included in the physical server 60a in a physical or logical manner, and, for example, operates two virtual servers 64. The hypervisor "A" 61a, for example, is a VMware vSphere Hypervisor (registered trademark), a Hyper-V (registered trademark), a Virtage (registered trademark), a KVM (registered trademark), a XenServer (registered trademark), an Oracle VM (registered trademark), or the like. The hypervisors "B" 61b and "C" 61c have the same configuration as that of the hypervisor "A" 61a. Here, each of the hypervisors "A" 61a to "C" 61c is one of the management targets of the management server 10.

In the hypervisor "A" 61a, a virtual switch 62a operates. In addition, in the hypervisor "B" 61b, a virtual switch 62b operates. In the hypervisor "C" 61c, virtual switch 62c operates.

The virtual switch 62a is an IP switch that is virtually realized by the hypervisor "A" 61a and virtually realizes a port group "A" 63a and a port group "B" 63b. A virtual local area network (VLAN) is formed by the port group "A" 63a and the port group "B" 63b. In the drawings described below, there are cases where a port group is denoted as a "PG".

The virtual switch 62b is an IP switch that is virtually realized by the hypervisor "B" 61b and virtually realizes a port group "C" 63c. A virtual local area network (VLAN) is formed by the port group "C" 63c.

The virtual switch 62c is an IP switch that is virtually realized by the hypervisor "C" 61c and virtually realizes a port group "D" 63d and a port group "E" 63e. A virtual local area network (VLAN) is formed by the port group "D" 63d and the port group "E" 63e.

In this embodiment, the port group "A" 63a and the port group "B" 63b that are port VLANs are configured on the virtual switches 62a to 62c. However, the present invention is not limited thereto, but a tagged VLAN may be configured.

As illustrated in FIG. 1, each of the port group "A" 63a and the port group "B" 63b are connected to two virtual servers 64.

The port group "C" 63c is connected to one virtual server 64 and the console 66.

The port group "D" 63d is connected to one virtual server 64 and the console 66.

The port group "E" 63e is connected to one virtual server 64.

The console 66 is connected to the management terminal 70 and controls the hypervisor "B" 61b, the hypervisor "C" 61c, and the virtual server 64.

The management network 100 is a network (thick solid line) that is used by the management terminal 70 and the management server 10 for managing the physical servers 60a to 60c, the hypervisor "A" 61a to the hypervisor "C" 61c, and the virtual server 64. The management network 100 may be any kind of network, as long as it can be connected to a management interface included in such a device or software. The management network 100 may be configured by either a physical local area network (LAN) or a VLAN. In a case where the management network 100 is configured by the physical LAN, the management network 100 may be either a wired network or a wireless network.

The storage network 110 is a network (thin solid line) that is used for transmitting data inside the logical units 50a to 50c disposed inside the storage device 40. The storage network 110 may be a storage area network (SAN) or an Internet protocol (IP) network for an Internet small computer system interface (iSCSI). The storage network 110 may be formed either on a network that is physically the same as the management network 100 or on a network that is physically different from the management network 100.

The business network 120 is a business network (broken line) that connects the physical servers 60a to 60c. This network may be any kind of network as long as the network is used by a business system. In other words, the business network 120 may be configured by either a physical LAN or a VLAN. In a case where the business network 120 is configured by the physical LAN, the business network may be either a wired network or a wireless network.

Figure 2:
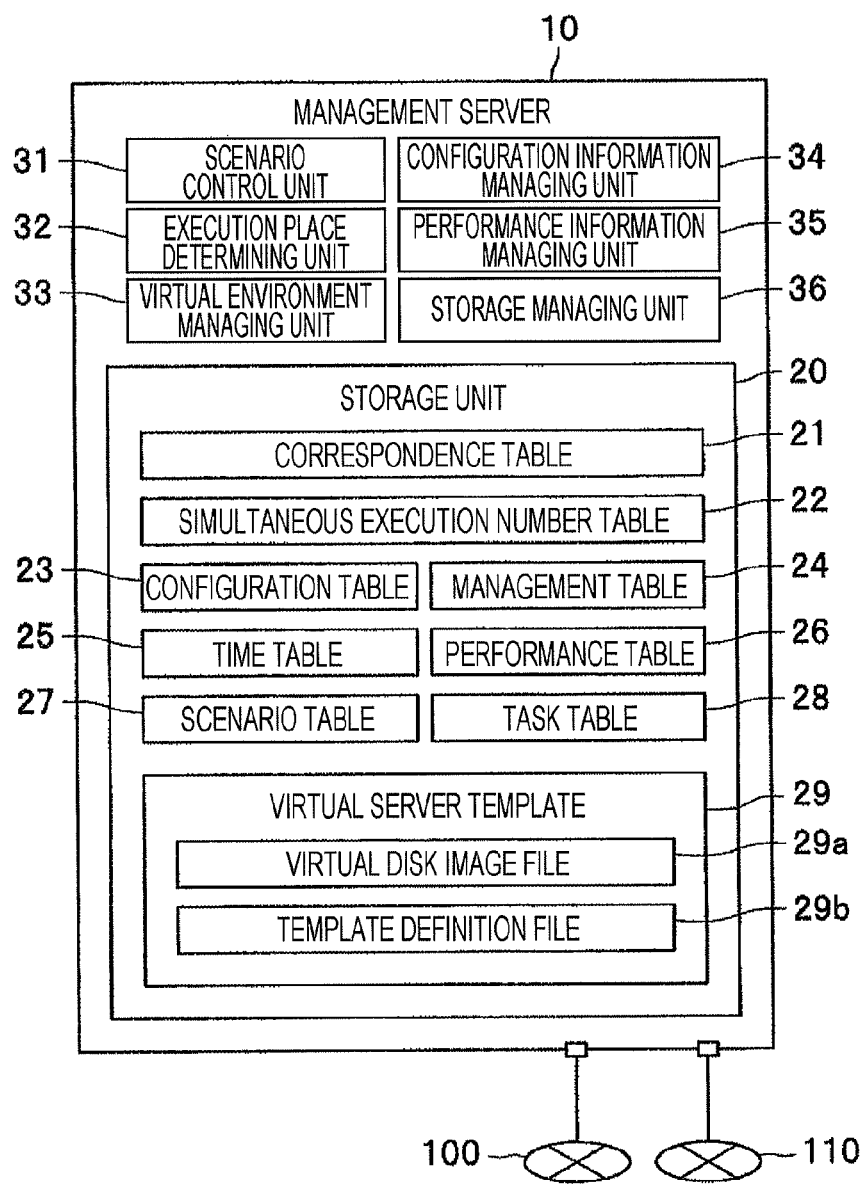
FIG. 2 is a diagram that illustrates the logical configuration of a management server according to the first embodiment.

FIG. 2 is a diagram that illustrates the logical configuration of a management server according to the first embodiment.

The management server 10 is equipped with: a storage unit 20; a scenario control unit 31; an execution place determining unit 32; a virtual environment managing unit 33; a configuration information managing unit 34; a performance information managing unit 35; and a storage managing unit 36.

The storage unit 20 stores management information of the management server 10. The storage unit 20 stores a correspondence table 21, a simultaneous execution number table 22, a configuration table 23, a management table 24, a time table 25, a performance table 26, a scenario table 27, a task table 28, and a virtual server template 29. In addition, the scenario table 27 includes a scenario table 27A (FIG. 14) and an additional scenario table 27B (FIG. 15) to be described later.

The virtual server template 29 is a template file of the virtual server 64 (FIG. 1) that is managed by the management server 10 as a library. The scenario control unit 31 can deploy the virtual server 64 in any of the hypervisor "A" 61a to the hypervisor "C" 61c (FIG. 1) in accordance with the template file of this virtual server template 29. The virtual server template 29 includes a virtual disk image file 29a and a template definition file 29b. The virtual disk image file 29a is a file that corresponds to a disk included in the virtual server 64.

The template definition file 29b is a file defining template information that is a source for deploying or cloning the virtual server 64. The virtual server template 29, for example, may be any of an open virtualization format (OVF) file, a virtual disk file image file (a VMDK (virtual machine disk) file or a virtual hard disk (VHD) file), and an open virtual appliance/application (OVA) file.

The other elements of the storage unit 20 will be described in detail with reference to FIGS. 6 to 16 to be described later.

The scenario control unit 31 performs a resource managing operation of the virtual server 64 based on scenario information that is defined in the scenario table 27. After reading the scenario table 27 and specifying scenario definition information based on a user request or the like, the scenario control unit 31 determines the execution place of the scenario through the execution place determining unit 32, changes the content of the scenario, and registers the scenario in the task table 28 as a task. In addition, the scenario control unit 31 fetches the task from the task table 28 and sequentially executes each step included in the task.

The execution place determining unit 32 determines the execution plate of the resource managing operation performed by the management server 10. The execution place determining unit 32 determines the execution place for each step such that the processing time is the shortest based on the simultaneous execution number stored in the simultaneous execution number table 22. However, the present invention is not limited thereto, but the execution place determining unit 32 may determine the execution place such that the management target is not overloaded based on the performance information stored in the performance table 26 or may determine the execution place so as not to have an adverse effect on the other virtual server 64 during an actual operation.

The virtual environment managing unit 33 manages the hypervisor "A" 61a to the hypervisor "C" 61c and the virtual server 64 to be described later. The management server 10 collects information of the hypervisor "A" 61a to the hypervisor "C" 61c and the virtual server 64 through the management interface of the virtual environment managing unit 33 and deploys the virtual server 64 from the virtual server template 29 by operating these. The virtual environment managing unit 33, for example, is vCenter Server (registered trademark) of VMware (registered trademark) Corp., SystemCenter VirtualMachineManager (registered trademark) of Microsoft (registered trademark) Corp., or the like.

The configuration information managing unit 34 collects and manages configuration information of the physical servers 60a to 60c and constituent elements thereof through the virtual environment managing unit 33. The configuration information managing unit 34 collects and manages the configuration information of the storage device 40 (FIG. 1) and the constituent elements thereof through the storage managing unit 36. The configuration information collected by the configuration information managing unit 34 is stored in the configuration table 23 and is read in accordance with a request from the other components.

The performance information managing unit 35 collects and manages the performance information of the physical servers 60a to 60c and the constituent elements thereof through the virtual environment managing unit 33. The performance information managing unit 35 collects and manages the performance information of the storage device 40 and the constituent elements thereof through the storage managing unit 36. The performance information collected by the performance information managing unit 35 is stored in the performance table 26 and is read in accordance with a request from the other components.

The storage managing unit 36 manages the storage device 40. The storage managing unit 36 collects configuration information of the logical units 50a to 50c or the storage control unit 41 included in the storage device 40 and generates, removes, and updates the logical units 50a to 50c through the storage control unit 41. In addition, the storage managing unit 36 executes management of switching between paths of the business network 120, setting and managing of the logical unit (LU) securities of the logical units 50a to 50c, and collection of configuration information of a network device (not illustrated in the figure) that configures the storage network 110.

Figure 3:
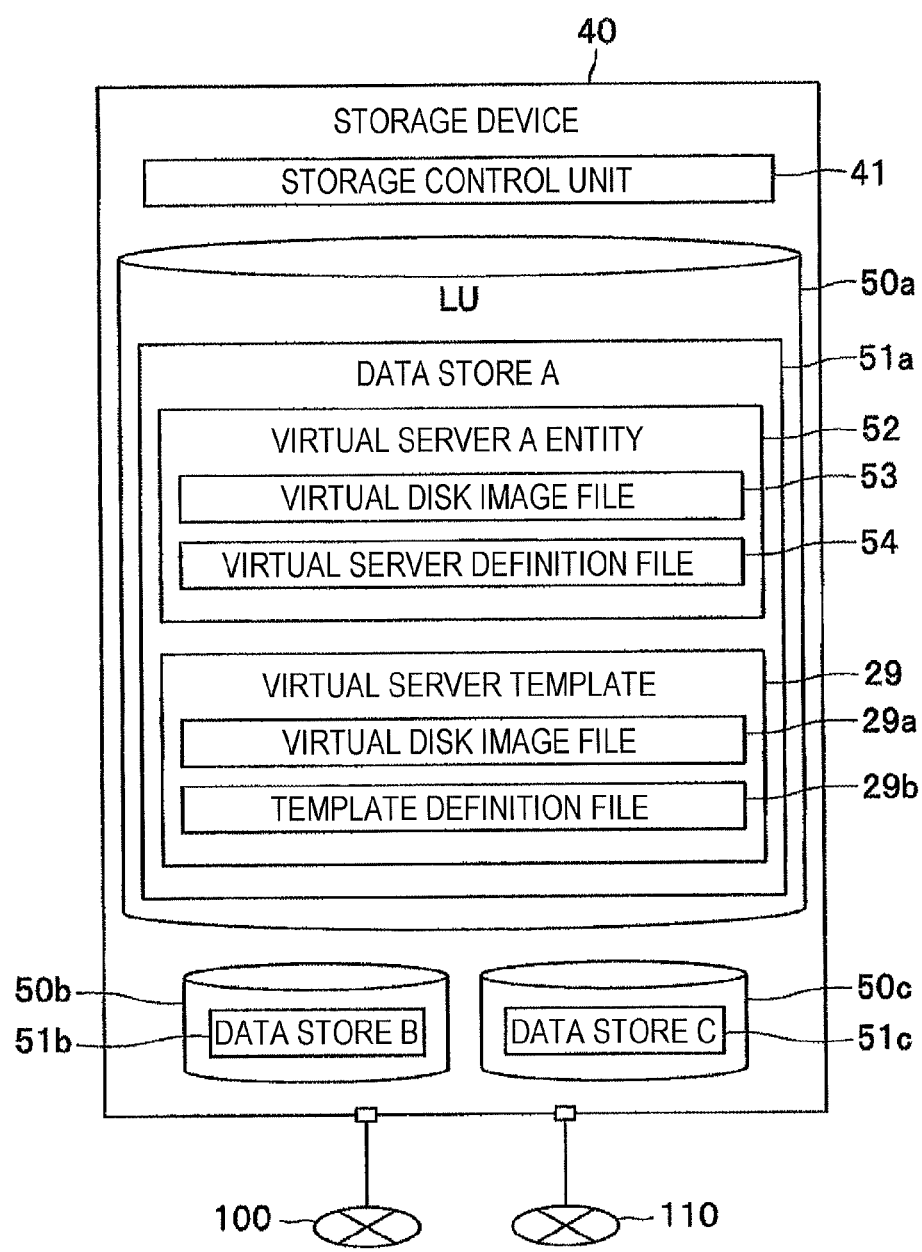
FIG. 3 is a diagram that illustrates the logical configuration of a storage device according to the first embodiment.

FIG. 3 is a diagram that illustrates the logical configuration of a storage device according to the first embodiment.

The storage device 40 is an external storage device that stores data. The storage device 40 includes a storage control unit 41 and, for example, logical units 50a, 50b, and 50c.

The storage control unit 41 performs control of redundant arrays of inexpensive disks (RAID) of the storage device 40 and control of input/output. The logical units 50a to 50c are disk devices that are provided by the storage device 40 for the physical servers 60a to 60c and the virtual server 64. The logical unit 50a includes the data store "A" 51a. In addition, the logical unit 50b includes the data store "B" 51b. The logical unit 50c includes the data store "C" 51c.

The data store "A" 51a is a file system that stores a virtual disk image file 53 of the virtual server 64 and the like. The data store "A" 51a, for example, is a data store that is formatted in accordance with a VMFS format of VMware (registered trademark) Corp, a file system that is formatted in accordance with the NTFS or the like in the Hyper-V (registered trademark) environment, a file system that is ext-formatted in the KVM (registered trademark) environment, or the like.

The data store "A" 51a includes a virtual server A entity 52 that is the entity of a file of a virtual server "A" 64a to be described later and the virtual server template 29. The virtual server A entity 52 is a combination of a virtual server definition file 54 and the virtual disk image file 53. The virtual server template 29 is a combination of the virtual disk image file 29a and the template definition file 29b. The data store "B" 51b and the data store "C" 51c have the same configuration as that of the data store "A" 51a.

The virtual disk image file 53 is a file that corresponds to a disk included in the virtual server 64 and, for example, is an open virtualization format (VMDK) file, a virtual hard disk (VHD) file, an image (IMG) file, an international organization for standardization (ISO) file, or the like.

The virtual server definition file 54 is a file that defines the hardware configuration and the like of the virtual server 64 and, for example, is a VMX file in the VMware (registered trademark) environment, an XML file in the Hyper-V (registered trademark) environment, or the like.

A combination of the virtual server definition file 54 and the virtual disk image file 53 is the virtual server A entity 52. In addition, a combination of the template definition file 29b and the virtual disk image file 29a is the virtual server template 29.

For deploying a new virtual server 64, there are two methods.

The first deployment method is a method in which a new virtual server 64 is deployed from the virtual server template 29 included in the management server 10 to the hypervisor "A" 61a, the data store "A" 51a, and the like through the management network 100 or the storage network 110.

The second deployment method is a method in which a new virtual server 64 is deployed inside the hypervisor "A" 61a or the like from the virtual server template 29 (the template definition file 29b and the virtual disk image file 53) stored in the data store "A" 51a and the like not through a network.

Figure 4:
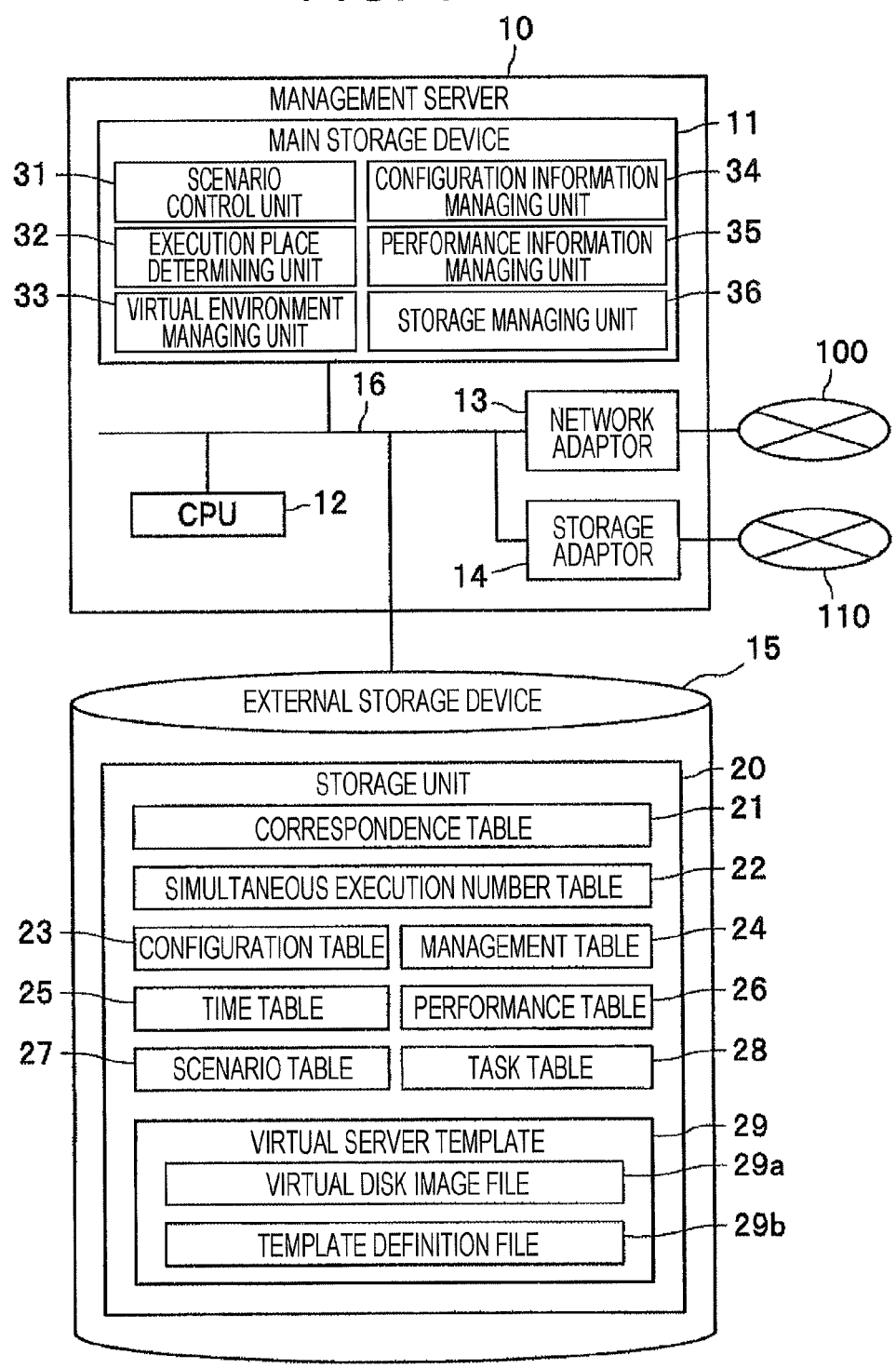
FIG. 4 is a diagram that illustrates the physical configuration of the management server according to the first embodiment.

FIG. 4 is a diagram that illustrates the physical configuration of the management server according to the first embodiment.

The management server 10 is equipped with: a central processing unit (CPU) 12; a main storage device 11; a network adaptor 13; a storage adaptor 14; an external storage medium 15; and a sharing bus 16. The CPU 12, the main storage device 11, the network adaptor 13, and the storage adaptor 14 are interconnected through the sharing bus 16.

The CPU 12 is a central processing unit that controls each unit included in the management server 10 and performs calculation and processing of data.

The main storage device 11 stores data and programs. Software programs that configure the scenario control unit 31, the execution place determining unit 32, the virtual environment managing unit 33, the configuration information managing unit 34, the performance information managing unit 35, and the storage managing unit 36 are stored in the main storage device 11. As the CPU 12 executes the software programs through the sharing bus 16, the scenario control unit 31, the execution place determining unit 32, the virtual environment managing unit 33, the configuration information managing unit 34, the performance information managing unit 35, and the storage managing unit 36 are realized.

The network adaptor 13 is an interface that is used for a connection with the management network 100. The network adaptor 13 transmits/receives data to/from an external device through the management network 100.

The storage adaptor 14 is an interface that is used for a connection with the storage network 110. The storage adaptor 14 transmits/receives data to/from an external device through the storage network 110.

The management network 100 may be any of an IP network and an asynchronous transfer mode (ATM) network. The storage network 110 may be any of the IP network, the ATM network, and a storage area network.

For example, the network adaptor 13 is an Ethernet (registered trademark) adaptor. The storage adaptor 14 is a host bus adaptor. In addition, the network adaptor 13 and the storage adaptor 14 may be host channel adaptors of Infiniband or Fibre Channel over Ethernet (FCoE; registered trademark) composite network adaptors.

The external storage medium 15 is a storage medium on the storage device 40. The external storage medium 15 may be any of a hard disk drive and a solid state drive using a flash memory. The external storage medium 15 may be installed outside the management server 10 and connected to the internal bus through the communication interface or may be built in the management server 10 and is directly connected to the internal bus.

The storage unit 20 is information stored in the external storage medium 15, and the information is read into the main storage device 11 and is processed by the CPU 12. Since the content of the storage unit 20 has been described as above with reference to FIG. 2, the description thereof will not be presented.

The sharing bus 16 is a communication path for communications of data among the CPU 12, the main storage device 11, the network adaptor 13, the storage adaptor 14, the external storage medium 15, and the like.

Figure 5:
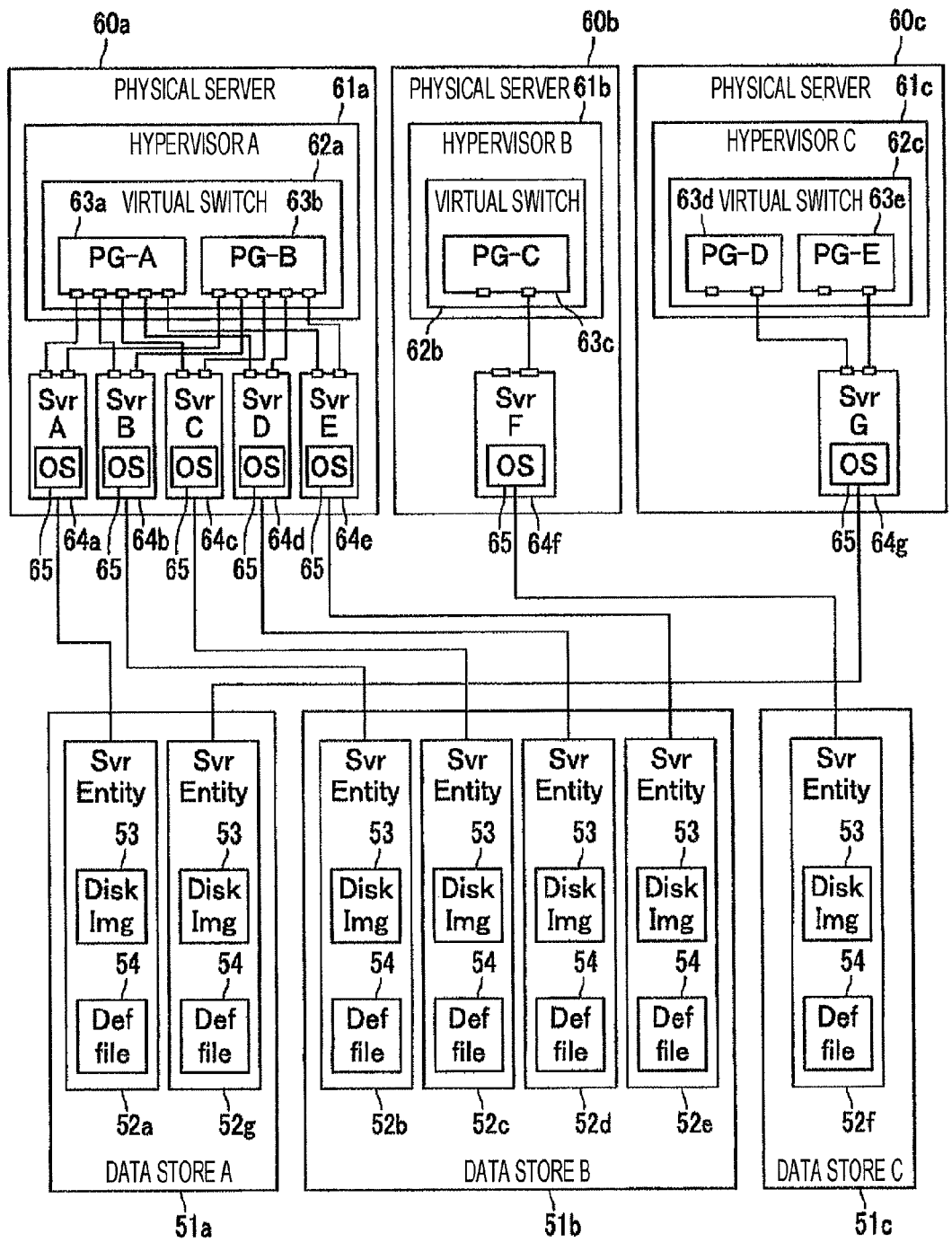
FIG. 5 is a diagram that illustrates the configuration of the management system according to the first embodiment.

FIG. 5 is a diagram that illustrates the configuration of a management system according to the first embodiment.

In this management system, the physical servers 60a to 60c and the data store "A" 51a to the data store "C" 51c are interconnected through a network not illustrated in the figure.

In the physical server 60a, the hypervisor "A" 61a operates. By this hypervisor "A" 61a, the virtual server "A" 64a to a virtual server "E" 64e are operated.

In the physical server 60b, the hypervisor "B" 61b operates. By this hypervisor "B" 61b, a virtual server "F" 64f is operated.

In the physical server 60c, the hypervisor "C" 61c operates. By this hypervisor "C" 61c, a virtual server "G" 64g is operated.

In the data store "A" 51a, virtual server entities 52a and 52g are stored. The virtual server entity 52a (Svr Entity) is the entity of a file that operates the virtual server "A" 64a. The virtual server entity 52g is the entity of a file that operates the virtual server "G" 64g.

In the data store "B" 51b, virtual server entities 52b to 52e are stored. The virtual server entity 52b is the entity of a file that operates the virtual server "B" 64b. The virtual server entity 52c is the entity of a file that operates the virtual server "C" 64c. The virtual server entity 52d is the entity of a file that operates the virtual server "D" 64d. The virtual server entity 52e is the entity of a file that operates the virtual server "E" 64e.

In the data store "C" 51c, a virtual server entity 52f is stored. The virtual server entity 52f is the entity of a file that operates the virtual server "F" 64f.

Each of the virtual server entities 52a to 52g includes a virtual disk image file 53 (Disk 1 mg) and a virtual server definition file 54 (Def File).

FIG. 6 is a diagram that illustrates an example of a correspondence table according to the first embodiment.

In the correspondence table 21, correspondence information between a temporary execution place and a final execution place at which execution is to be originally performed when there is an operation request for the virtual server 64 (FIG. 1) in a certain place is stored. In the case of the deployment, in the correspondence table 21, correspondence information between an execution place at which deployment is temporarily made and a final execution place at which arrangement is made at the time of completion of the deployment is stored. Here, the "place", for example, represents a combination of a hypervisor, a data store, and a port group. However, the place is not limited thereto, and a combination of a hypervisor and a data store may be configured as the "place". Furthermore, a combination of a hypervisor, a data store, and any of a VLAN-ID of the virtual server 64, a port of the network device, an IP address of the virtual server 64, and a host name of the virtual server 64 may be configured as the "place".

The correspondence table 21 includes a task number field 21a, a temporary configuration field 21b, and a final configuration field 21c. In the following drawings, a number may be denoted as "#".

In the task number field 21a, information that uniquely identifies task information requested from a user is stored. Records in which the same task number is stored in the task number field 21a represent correspondence information that relates to the same task.

In the temporary configuration field 21b, identification information of an instance that configures the temporary execution place is stored. In this embodiment, for example, "hypervisor G" identifying an instance of a hypervisor that configures a temporary execution place is stored.

In the final configuration field 21c, identification information of an instance that configures the final execution place at which execution is to be originally performed is stored. In this embodiment, for example, "hypervisor A" identifying an instance of a hypervisor that configures a final execution place is stored.

FIG. 7 is a diagram that illustrates an example of the simultaneous execution number table according to the first embodiment.

In each record of the simultaneous execution number table 22, the simultaneous execution number of a corresponding resource at the current state and an executable maximum simultaneous execution number are stored with the instance information of the resource being configured as the key.

In the simultaneous execution number table 22, an instance field 22a, an operation type field 22b, a simultaneous execution number field 22c, and a maximum simultaneous execution number field 22d are included.

In the instance field 22a, key information that uniquely identifies the instance information of a resource is stored. In this embodiment, an identifier of a hypervisor, an identifier of a data store, and the like are stored.

In the operation type field 22b, type information of a user request task is stored. In this embodiment, for example, in the case of deploying or cloning (copy) of the virtual server 64 (FIG. 5), "provisioning" is stored therein. On the other hand, in the case of power-on, power-off, resetting, shutdown, rebooting, or the like of the virtual server 64 (FIG. 5), "power control" is stored therein. In a case where the virtual server 64 (FIG. 5) is moved to another hypervisor, "live migration" is stored therein. In a case where the virtual disk image file 53 (FIG. 5) corresponding to the virtual server 64 (FIG. 5) is moved between mutually-different data stores, "storage migration" is stored therein.

In the simultaneous execution number field 22c, the current simultaneous execution number of a task that relates to a corresponding instance and belongs to the operation type stored in the operation type field 22b is stored. For example, when two deployment tasks for the hypervisor "A" 61a (FIG. 5) and the data store "A" 51a (FIG. 5) and two deployment tasks for the hypervisor "A" 61a (FIG. 5) and the data store "B" 51b (FIG. 5) are executed, and the other processes are not executed, the simultaneous execution number of the hypervisor "A" 61a (FIG. 5) is four, the simultaneous execution number of the data store "A" 51a (FIG. 5) is two, and the simultaneous execution number of the data store "B" 51b (FIG. 5) is two.

The information stored in the simultaneous execution number field 22c is updated on a regular basis by the performance information managing unit 35 (FIG. 2) through the virtual environment managing unit 33 (FIG. 2). The virtual environment managing unit 33 (FIG. 2) controls the simultaneous execution number of each task so as to not to exceed the maximum simultaneous execution number that is internally managed.

In the maximum simultaneous execution number field 22d, the maximum executable number of tasks that relates to a corresponding instant and belongs to the operation type stored in the operation type field 22b is stored. For example, in a case where the maximum simultaneous execution number of a task belonging to the provisioning type for the hypervisor "A" 61a (FIG. 5) is four, it represents that a maximum of four deployments for the hypervisor "A" 61a (FIG. 5) are executable unless the other tasks are not executed. In addition, in a case where the maximum simultaneous execution number of the hypervisor "A" 61*a* (FIG. 5) is four, and the maximum simultaneous execution number of the data store "A" 51*a* (FIG. 5) is four, in a situation in which two deployments for the hypervisor "B" 61*b* (FIG. 5) and the data store "A" 51*a* (FIG. 5) are executed, only up to two deployments for the hypervisor "A" 61*a* (FIG. 5) and the data store "A" 51*a* (FIG. 5) are executable thereafter.

FIG. 8 is a diagram that illustrates an example of the configuration table according to the first embodiment.

In the configuration table 23, configuration information of each management target of the management server 10 is stored. The configuration table 23 includes a configuration table 23A that represents the configuration information of the hypervisor, a configuration table 23B (FIG. 9) that represents the configuration information of the virtual server 64, and a configuration table 23C (FIG. 10) that represents the configuration information of the data store.

In the configuration table 23, relation information of a hypervisor and the virtual server 64 (FIG. 5) operating on the hypervisor, relation information of a hypervisor and a port group built on the hypervisor, relation information of a hypervisor and a data store having connection relation with the hypervisor, relation information of a virtual server 64 and a data store storing the virtual server entities 52 (FIG. 5) (the virtual disk image file 53 and the virtual server definition file 54) corresponding to the virtual server 64, and relation information of a virtual server 64 (FIG. 5) and a port group having connection relation with the virtual server 64 are additionally stored.

The configuration table 23A includes a hypervisor field 23*a*, a task execution-dedicated flag field 23*b*, a data store field 23*c*, a virtual server field 23*d*, and a port group field 23*e*.

In the hypervisor field 23*a*, information that uniquely identifies a corresponding hypervisor is stored.

In the task execution-dedicated flag field 23*b*, flag information representing whether or not a corresponding hypervisor is a hypervisor dedicatedly used for executing a resource managing operation task for the virtual server 64 is stored. In a case where the task execution-dedicated flag field 23*b* is "True", it represents that a corresponding hypervisor is a hypervisor dedicatedly used for executing the resource managing operation task. On the other hand, in a case where the task execution-dedicated flag field 23*b* is "False", it represents that a corresponding hypervisor is a hypervisor that is not dedicatedly used for executing the resource managing operation task. The scenario control unit 31 selects a hypervisor in which the flag is "True" in the task execution-dedicated flag field 23*b* as a temporary execution place of the task with high priority. In a case where all the task execution-dedicated flag fields 23*b* are "False", one hypervisor is selected based on the other priority information. The task execution-dedicated flag field 23*b* according to this embodiment is merely an example and is not limited to such a configuration. Thus, the task execution-dedicated flag field 23*b* may be any kind of information as long as the information can be used for determining the priority of a hypervisor.

In the data store field 23*c*, an information set uniquely identifying a data store that is connected to a corresponding hypervisor is stored. In this embodiment, for example, the data store "A" 51*a* and the data store "B" 51*b* are represented to be connected to the hypervisor "A" 61*a*.

In the virtual server field 23*d*, an information set that uniquely identifies a virtual server 64 operating on a corresponding hypervisor is stored. The virtual server field 23*d* according to this embodiment represents that the virtual server "A" 64*a*, the virtual server "B" 64*b*, the virtual server "C" 64*c*, the virtual server "D" 64*d*, and the virtual server "E" 64*e* operate on the hypervisor "A" 61*a*.

In the port group field 23*e*, an information set that uniquely identifies a port group built on a corresponding hypervisor is stored. The port group field 23*e* according to this embodiment represents that the port group "A" 63*a* and the port group "B" 63*b* operate in the hypervisor "A" 61*a*.

Figure 9:
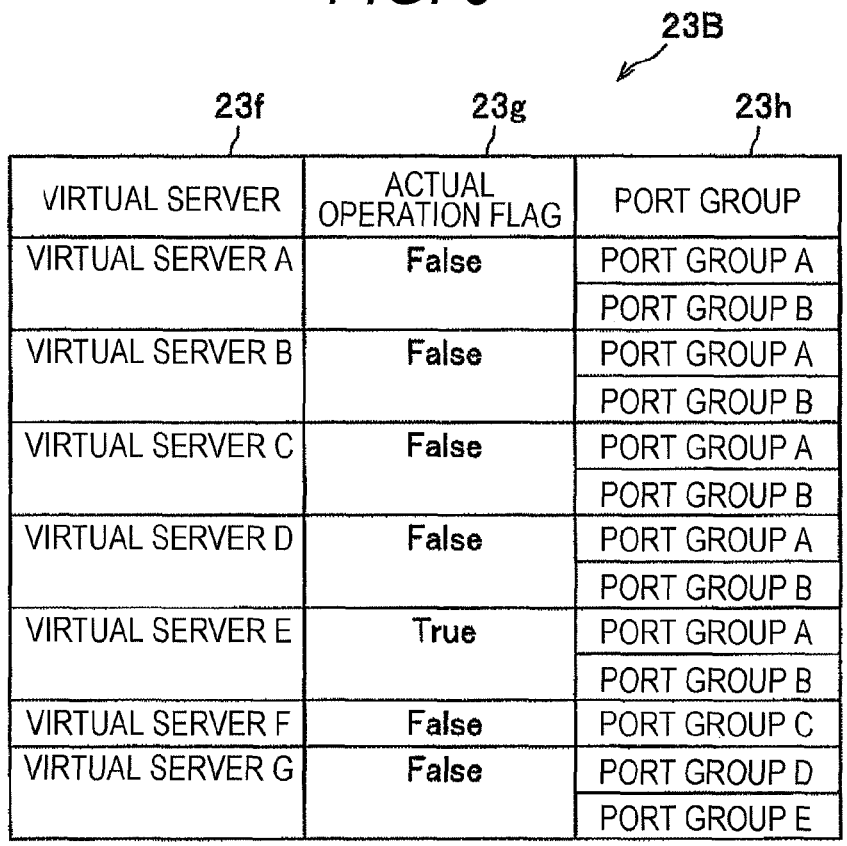
FIG. 9 is a diagram that illustrates an example of configuration information of a virtual server according to the first embodiment.

FIG. 9 is a diagram that illustrates an example of configuration information of a virtual server according to the first embodiment.

In the configuration table 23B, the configuration information of a virtual server 64 (FIG. 5) and relation information with an instance relating to the virtual server 64 are stored. The configuration table 23B includes a virtual server field 23*f*, an actual operation flag field 23*g*, and a port group field 23*h*.

In the virtual server field 23*f*, information that uniquely identifies a corresponding virtual server 64 (FIG. 5) is stored.

In the actual operation flag field 23*g*, flag information representing whether or not a corresponding virtual server 64 is in the state of being in the middle of execution of the resource managing operation according to the management server 10 (FIG. 1) before the actual operation is stored. In a case where "True" is stored in the actual operation flag field 23*g*, it represents that the corresponding virtual server 64 is in the state after the actual operation. On the other hand, in a case where "False" is stored in the actual operation flag field 23*g*, it represents that the corresponding virtual server 64 is in the state of being in the middle of execution of the resource managing operation according to the management server 10 before the actual operation. More specifically, being in the middle of the execution of the resource managing operation represents any of being in the middle of deploying the virtual server, being in the middle of operating the virtual server, being in the middle of re-operating the virtual server, and being in the middle of maintenance. In the virtual server 64 of which the actual operation flag field 23*g* is "True", a business service is in the middle of the operation. Accordingly, it is necessary not to give an adverse effect on the business service provided by the virtual server 64 that is in the middle of the operation by avoiding the place of the virtual server 64 that is in the middle of the operation as the place of the resource managing operation.

In the port group field 23*h*, a list of port groups to which a corresponding virtual server 64 is connected is stored. For example, the virtual server "A" 64*a* is represented to be connected to the port group "A" 63*a* and the port group "B" 63*b*.

FIG. 10 is a diagram that illustrates an example of configuration information of the data store according to the first embodiment.

In the configuration table 23C, the configuration information of a data store and relation information with an instance relating to the data store are stored. A data store field 23*i* is used as key information, and the configuration information relating to the data store is stored in each record.

The configuration table 23C includes the data store field 23*i* and a virtual server field 23*j*.

In the data store field 23*i*, information that uniquely identifies a corresponding data store is stored.

In the virtual server field 23*j*, an information set that uniquely identifies a virtual server 64 (FIG. 5) corresponding to the virtual server entity 52 (FIG. 5) (the virtual disk image file 53 and the virtual server definition file 54) stored on the data store is stored. For example, it is represented that, in the data store "A" 51a, the virtual server entity 52a (FIG. 5) corresponding to the virtual server "A" 64a (FIG. 5) is stored, and additionally, the virtual server entity 52g (FIG. 5) corresponding to the virtual server "G" 64g (FIG. 5) is stored.

FIG. 11 is a diagram that illustrates an example of a management table of hypervisors according to the first embodiment.

The management table 24 includes a hypervisor field 24a and a management authority field 24b.

In the hypervisor field 24a, information that uniquely identifies a corresponding hypervisor is stored.

In the management authority field 24b, information that represents management authorities of the hypervisor is stored.

In this embodiment, the hypervisor "A" 61a (FIG. 5) has an authority for accessing the data store "A" 51a (FIG. 5) and an authority for accessing the data store "B" 51b (FIG. 5).

The hypervisor "B" 61b (FIG. 5) has an authority for accessing the data store "C" 51c (FIG. 5).

The hypervisor "C" 61c (FIG. 5) has an authority for accessing the data store "A" 51a (FIG. 5), an authority for accessing the data store "B" 51b (FIG. 5), and an authority for accessing the data store "C" 51c (FIG. 5).

FIG. 12 is a diagram that illustrates an example of a time table according to the first embodiment.

In the time table 25, an estimated processing time of a resource managing operation for the virtual server 64 (FIG. 5) is stored. The operation field 25a and the instance field 25b are used as a key as a set, and the estimated processing time of the resource managing operation task is stored in each record.

The time table 25 includes an operation field 25a, an instance field 25b, and an estimated processing time field 25c.

In the operation field 25a, information that represents the type of a corresponding resource managing operation task is stored.

In the instance field 25b, information that uniquely identifies an instance that is the target for the resource managing operation task is stored.

In the estimated processing time field 25c, an estimated time of the processing time required for a case where a resource managing operation task stored in the operation field 25a is executed for an instance stored in the instance field 25b is stored.

In this embodiment, for example, in a case where the virtual server 64 (FIG. 5) is deployed using the virtual server template "A", a time of about 30 minutes is represented to be necessary. The management server 10 uses this estimated processing time as the reference and adjusts the estimated processing time used as the reference in accordance with the load status of the deployment destination and the load status of the network transmission line.

FIG. 13 is a diagram that illustrates an example of the performance table according to the first embodiment.

In the performance table 26, the performance information of each instance included in the management target of the management server 10 (FIG. 1) is stored, and, for example, the performance information of each hypervisor and the performance information of each data store are stored. In each record of the performance table 26, the performance information of each instance is stored.

The performance table 26 includes a time field 26a, an instance field 26b, a metric field 26c, and a metric value field 26d.

In the time field 26a, time at which the performance information is collected by the performance information managing unit 35 is stored. However, the time is not limited thereto, but time at which the performance information is recorded by the management target may be stored.

In the instance field 26b, information that uniquely identifies instance information that is a target of the performance information is stored.

In the metric field 26c, identification information of the type of the performance information is stored.

In the metric value field 26d, an acquired value of the metric specified in the metric field 26c relating to an instance specified in the instance field 26b is stored.

In this embodiment, for example, it is represented that a sum of CPU-allocation insufficient amounts of all the virtual servers 64 operating on the hypervisor "A" 61a (FIG. 5) is 300 MHz at time of 10:00 on Jul. 31, 2011.

FIG. 14 is a diagram that illustrates an example of the scenario table according to the first embodiment.

In the scenario table 27A, scenario definition information of the resource managing operation provided by the management server 10 is stored. The scenario definition information is configured by a plurality of divided steps, and, by sequentially executing the steps, the scenario is executed.

The scenario table 27A includes a scenario number field 27a, a type field 27b, an argument field 27c, a step field 27d, and a network field 27e.

In the scenario number field 27a, information that uniquely identifies the scenario definition information is stored.

In the type field 27b, the type information of the scenario definition information is stored.

In the argument field 27c, argument definition information for executing the scenario definition information is stored.

In the step field 27d, a list of step information that configures the scenario definition information is stored.

In the network field 27e, flag information representing whether or not a step stored in the step field 27d includes a communication process using the network is stored. In a case where "True" is stored in the network field 27e, it represents that a communication process using the network is included. On the other hand, in a case where "False" is stored therein, it represents that a communication process using the network is not included. Here, a step in which "False" is stored represents that it can be executed on any hypervisor without depending on the configuration condition of the network.

FIG. 15 is a diagram that illustrates an example of the additional scenario table according to the first embodiment.

In the additional scenario table 27B, in a case where the execution place of the task is changed, scenario definition information added to the scenario described in the scenario table 27A is stored.

The additional scenario table 27B includes a type field 27f, a condition field 27g, an argument field 27h, and a step field 27i.

In the type field 27f, similar to the type field 27b (FIG. 14), type information of the scenario definition information is stored.

In the condition field 27g, a condition for adding the scenario definition information is stored.

In the argument field 27h, similar to the argument field 27c (FIG. 14), argument definition information for executing the scenario definition information is stored.

In the step field 27i, similar to the step field 27d, a list of step information that configures the scenario definition information is stored.

FIG. 16 is a diagram that illustrates an example of the task table according to the first embodiment.

The task table 28 is a table that stores a list of resource managing operation tasks that are in the middle of execution and the contents thereof. In each record of the task table 28, the content of each task that is in the middle of execution is stored.

The task table 28 includes a task number field 28a, a scenario number field 28b, an argument field 28c, a step field 28d, and a network field 28e.

In the task number field 28a, information that uniquely identifies a task that is in the middle of execution is stored.

In the scenario number field 28b, information that uniquely identifies scenario definition information, which is the source of a task, is stored.

In the argument field 28c, a list of information that uniquely identifies instance information passed as the argument of the scenario is stored.

In the step field 28d, a list of step processing information to be executed by dividing the task is stored. In a case where the task is executed, the list of the task processing information is sequentially executed.

Operation According to First Embodiment

Figure 17:
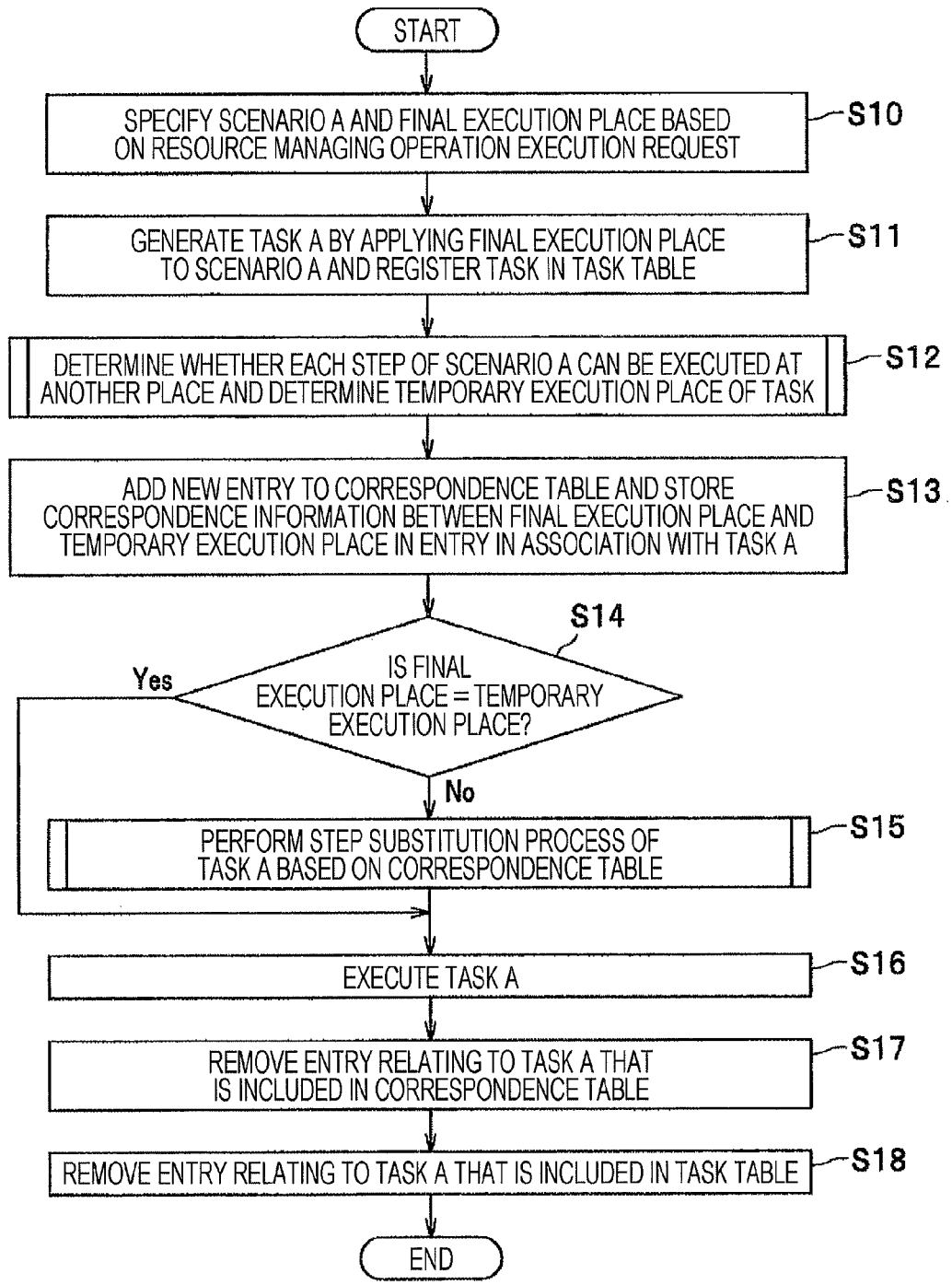
FIG. 17 is a flowchart that illustrates a resource managing operation according to the first embodiment.

FIG. 17 is a flowchart that illustrates the resource managing operation according to the first embodiment.

When the process is started, in Process S10, the scenario control unit 31 of the management server 10 specifies the scenario A and the final execution place in accordance with a resource managing operation execution request. The resource managing operation execution request is a request from the management terminal 70 or a processing program. The final execution place is an execution place at the time of completing the resource managing operation request and, for example, is a combination of the hypervisor "A" 61a, the data store "A" 51a, the port group "A" 63a, and the port group "B" 63b (FIG. 5).

More specifically, the resource managing operation request is assumed to be a request for deploying the virtual server "A" 64a in the hypervisor "A" 61a and the data store "A" 51a using a template A. At this time, a scenario for deploying the virtual server "A" 64a is specified, and, at the time of completion of the deployment, it is specified that the virtual server "A" 64a needs to be operated on the hypervisor "A" 61a and the data store "A" 51a. In addition, when a user designates the deployed virtual server "A" 64a to be connected to the port group "A" 63a and the port group "B" 63b on the hypervisor "A" 61a, the port group "A" 63a and the port group "B" 63b are specified as connection destination port groups. The scenario control unit 31 of the management server 10 searches the scenario table 27A, specifies a record in which "Deploy" is stored in the type field 27b, and specifies a scenario number stored in the scenario number field 27a of the record.

In Process S11, the scenario control unit 31 of the management server 10 generates a task A acquired by applying the final execution place to the scenario A and registers the generated task in the task table 28.

More specifically, a new entry is added to the task table 28. In the task number field 28a of the new entry, a newly generated task number that can uniquely identify the task is stored. For example, in the scenario number field 28b in which task "3" is stored, the scenario number specified in Process S10 is stored as scenario "1".

In the argument field 28c of the new entry, information of "the template A, the hypervisor A, the data store A, and the port groups A and B" specified by the resource managing operation is stored.

In the step field 28d of the new entry, a content specifying the execution place in accordance with the scenario number field 27a of the scenario table 27A is stored. More specifically, the scenario control unit 31 of the management server 10 specifies a record by searching the scenario number field 27a of the scenario table 27A by using the scenario number specified in Process S10. By substituting the step field 27d of the specified record with the execution place in the argument field 28c, the execution place is specified. For example, in the argument field 28c of the new entry, the following is substituted as the execution place.

Hypervisor x=Hypervisor A
Data Store x=Data Store A
Port Group x=Port Groups A and B The specific content acquired by substituting the value of the final execution place into the argument field 28c of the new entry is the following series of steps. However, this is a series of steps during the generation but is not a step that is executed by the scenario control unit 31 of the management server 10.

1: Generate Port Groups A and B in Hypervisor A
2: Generate Virtual Server from Template A in Hypervisor A and Data Store A
3: Hypervisor A Connects Generated Virtual Server to Port Groups A and B
4: Hypervisor A Customizes Guest OS of Generated Virtual Server
5: Hypervisor A Customizes Application of Generated Virtual Server
6: Hypervisor A Checks Communication of Generated Virtual Server In addition, the scenario control unit 31 of the management server 10 stores the content of the network field 27e of the new entry in the network field 28e.

In Process S12, the scenario control unit 31 of the management server 10 performs an execution place determining process in which it is determined whether or not each step of the scenario A can be executed at another place, and a temporary execution place of the task at which the step is alternatively executed is determined. The temporary execution place of the task, for example, is a combination of the hypervisor "C" 61c, the data store "A" 51a, the port group "D" 63d, and the port group "E" 63e (FIG. 5). This execution place determining process will be described in detail with reference to FIG. 18 to be described later.

When it is detected that the scenario A cannot be immediately executed at the final execution place, the scenario control unit 31 of the management server 10 determines whether or not there is a temporary execution place at which the scenario can be immediately processed. In a case where it is determined that there is a temporary execution place at which the scenario can be immediately processed, the scenario control unit 31 of the management server 10 determines that the scenario is processed at the temporary execution place.

More specifically, first, the scenario control unit 31 of the management server 10 refers to the values of the simultaneous execution number field 22c and the maximum simultaneous execution number field 22d of the hypervisor "A" 61a and the data store "A" 51a by referring to the simultaneous execution number table 22. In this embodiment, the simultaneous execution number of the provisioning process (the deployment process is included in the provisioning process) of the hypervisor "A" 61*a* arrives at the maximum simultaneous execution number. Accordingly, the scenario control unit 31 of the management server 10 determines that the hypervisor "A" 61*a* does not immediately execute the task but queues the task. In order to avoid a delay of the task according to the queuing standby, the scenario control unit 31 of the management server 10 determines whether or not there is a temporary execution place at which the task can be immediately processed. In a case where it is determined that there is a temporary execution place at which the task can be immediately executed, the scenario control unit 31 of the management server 10 determines that the scenario is executed at the temporary execution place.

Next, the scenario control unit 31 of the management server 10 specifies the temporary execution place as a combination of the hypervisor "C" 61*c*, the data store "A" 51*a*, the port group "D" 63*d*, and the port group "E" 63*e* (FIG. 5). The scenario control unit 31 of the management server 10 determines that a step in which the network field 28*e* is "False" out of the steps specified in Process S11 is executed at the temporary execution place and determines that a step in which the network field 28*e* is "True" is executed at the final execution place.

In Process S13, the scenario control unit 31 of the management server 10 adds correspondence information between the final execution place and the temporary execution place to the correspondence table 21. More specifically, the scenario control unit 31 of the management server 10 adds a new entry to the correspondence table 21 and stores the generated task number in the task number field 28*a*. In addition, the scenario control unit 31 of the management server 10 stores information that uniquely identifies the temporary execution place in the temporary configuration field 21*b* and stores information that uniquely identifies the final execution place in the final configuration field 21*c*.

For example, the scenario control unit 31 of the management server 10 adds first to fourth entries represented below to the correspondence table 21.

In the first entry, "task 3" is stored in the task number field 21*a*, "hypervisor C" is stored in the temporary configuration field 21*b*, and "hypervisor A" is stored in the final configuration field 21*c*.

In the second entry, "task 3" is stored in the task number field 21*a*, "port group D" is stored in the temporary configuration field 21*b*, and "port group A" is stored in the final configuration field 21*c*.

In the third entry, "task 3" is stored in the task number field 21*a*, "port group E" is stored in the temporary configuration field 21*b*, and "port group B" is stored in the final configuration field 21*c*.

In the fourth entry, "task 3" is stored in the task number field 21*a*, "data store A" is stored in the temporary configuration field 21*b*, and "data store A" is stored in the final configuration field 21*c*.

This correspondence table 21 represents that the temporary execution place is a combination of the hypervisor C, the port group D, the port group E, and the data store A (FIG. 5). In addition, the correspondence table 21 represents that the final execution place is a combination of the hypervisor A, the port group A, the port group B, and the data store A (FIG. 5).

In Process S14, the scenario control unit 31 of the management server 10 determines whether or not the final execution place and the temporary execution place are the same and determines whether or not the substitution process of each step of the task A is necessary. In a case where it is determined that the final execution place and the temporary execution place are the same (Yes), the scenario control unit 31 of the management server 10 performs Process S16. On the other hand, in a case where it is determined that the final execution place and the temporary execution place are not the same (No), the scenario control unit 31 performs Process S15.

In Process S15, the scenario control unit 31 of the management server 10 executes the step substitution process of the task A in accordance with the correspondence table 21. This step substitution process will be described in detail with reference to FIG. 19 to be described later.

More specifically, in a case where "False" is stored in the network field 28*e*, the scenario control unit 31 of the management server 10 stores the value of the argument field 28*c* by being substituted in the temporary execution place from the final execution place.

The network field 28*e* of the new entry is "False", and a step that is stored by being substituted in the temporary execution place is represented as below. However, this is a series of steps during the generation and is not a step executed by the scenario control unit 31 of the management server 10.

1: Generate Port Groups D and E in Hypervisor C
2: Generate Virtual Server from Template A in Hypervisor C and Data Store A
3: Hypervisor C Connects Generated Virtual Server to Port Groups D and E
4: Hypervisor C Customizes Guest OS of Generated Virtual Server A step in which the network field 28*e* of the new entry is "True" is illustrated as below.

5: Hypervisor A Customizes Application of Generated Virtual Server
6: Hypervisor A Checks Communication of Generated Virtual Server As a result of the substitution, in a case where the execution place is different in the "previous step" and the "current step", the scenario control unit 31 of the management server 10 adds a step for changing the execution place before the "current step". Here, the step for changing the execution place is a step in which live migration of the virtual server 64 is executed, a step in which storage migration of the virtual server 64 is executed, or the like.

As a result of the addition of the step for changing the execution place, in a case where there is an additionally necessary step, the scenario control unit 31 of the management server 10 adds the additionally necessary step. Here, the additionally necessary step, for example, is a step for changing the connection between the virtual server 64 and the port group. In this embodiment, the scenario control unit 31 of the management server 10 determines the step for changing the execution place and the additionally necessary step by referring to the correspondence table 21 and the additional scenario table 27B.

In this embodiment, the data store A is substituted in a data store p that is the final execution place, and the data stored A is substituted also in a data store q that is the temporary execution place. In other words, since a condition of "data store p=data store q" is satisfied, the scenario control unit 31 of the management server 10 selects each step in which "data store p=data store q" is described in the condition field 27*g* from the additional scenario table 27C, substitutes an argument therein, and then, inserts the step in the step field 28*d* of the task table 28. At this time, the scenario control unit 31 of the management server 10 inserts the step before a step having the execution place to be different from that of the "previous step". The value of the step field 28*d* at this time point is as below. The following series of steps is executed in Process S16 to be described later by the scenario control unit 31 of the management server 10.

1: Generate Port Groups D and E in Hypervisor C
2: Generate Virtual Server from Template A in Hypervisor C and Data Store A
3: Hypervisor C Connects Generated Virtual Server to Port Groups D and E
4: Hypervisor C Customizes Guest OS of Generated Virtual Server
5: Generate Port Groups A and B in Hypervisor A
6: Perform Live Migration of Virtual Server Generated in Hypervisor B to Hypervisor A
7: Connect Generated Virtual Server to Port Groups A and B
8: Hypervisor A Customizes Application of Generated Virtual Server
9: Hypervisor A Checks Communication of Generated Virtual Server A step having the execution place to be different from that of the "previous step" is the "step 4" described above, and steps having the execution place to be changed are "steps 5 and 6". In addition, the additionally necessary step is the "step 7" described above.

In Process S16, the scenario control unit 31 of the management server 10 executes the task A. The scenario control unit 31 of the management server 10 searches the task number field 28*a* of the task table 28, specifies a record that corresponds to the task A, and sequentially executes steps stored in the step field 28*d* of the record.

In Process S17, the scenario control unit 31 of the management server 10 removes entries relating to the task A that are included in the correspondence table 21. More specifically, the scenario control unit 31 of the management server 10 searches the task number field 21*a* of the correspondence table 21, specifies a record that corresponds to the task A, and removes the specified record from the correspondence table 21. In a case where there are a plurality of specified records, all the records are removed.

In Process S18, the scenario control unit 31 of the management server 10 removes the entries relating to the task A that are included in the task table 28. More specifically, the scenario control unit 31 of the management server 10 searches the task number field 28*a* of the task table 28, specifies records that correspond to the task A, and removes the specified records from the task table 28. When Process S18 is completed, the whole process illustrated in FIG. 17 ends.

According to such a process, in a case where the resource managing operation cannot be directly executed at the final execution place, the resource managing operation is executed at the temporary execution place and is returned to the final execution place. Accordingly, the time required for the resource managing operation can be shortened. In a case where a long time is required for the step executed at the temporary execution place, and a change from the temporary execution place to the final execution place is completed in a short time, such an operation is particularly effective.

In addition, in a case where there is no restriction on the execution place in the step executed at the temporary execution place, the resource managing operation task does not need to be executed at the final execution place. At this time, as the number of options for the temporary execution place increases, the standby time due to the queuing of the resource managing operation decreases.

Figure 18:
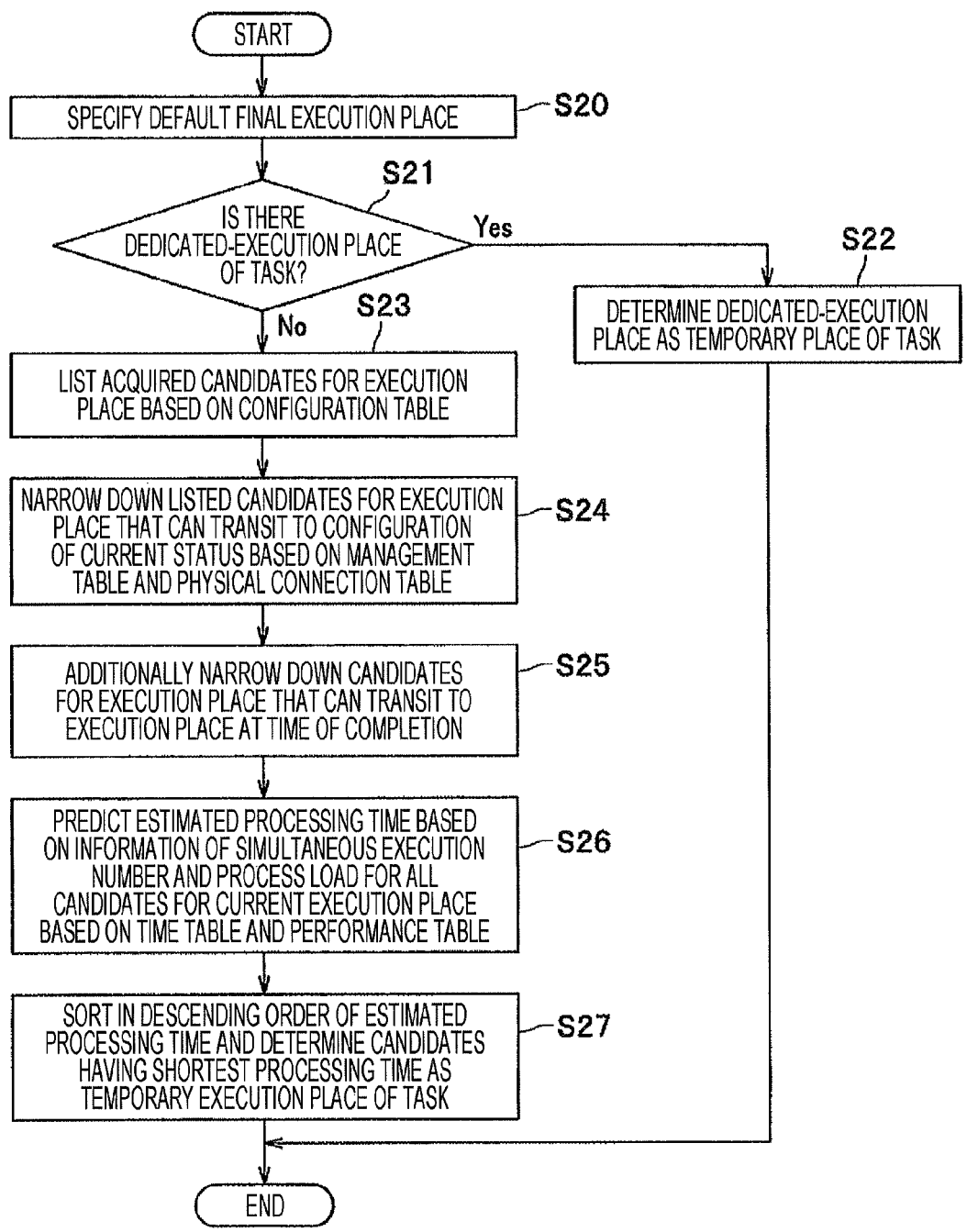
FIG. 18 is a flowchart that illustrates an execution place determining process according to the first embodiment.

FIG. 18 is a flowchart that illustrates the execution place determining process according to the first embodiment.

This corresponds to a flow, in which Process S12 is represented in detail, that is included in the whole flow (FIG. 17) described above and corresponds to a process in which the scenario control unit 31 determines the temporary execution place through the execution place determining unit 32.

When the process is started, in Process S20, the execution place determining unit 32 of the management server 10 specifies a default final execution place. In this embodiment, the final execution place corresponds to the hypervisor "A" 61*a* and the data store "A" 51*a*.

In Process S21, the execution place determining unit 32 of the management server 10 determines whether or not there is a dedicated execution place of the task by referring to the task execution-dedicated flag field 23*b* of the configuration table 23A. In a case where it is determined that there is a dedicated execution place of the task (Yes), Process S22 is performed. On the other hand, in a case where it is determined that there is no dedicated execution place of the task (No), Process S23 is performed.

In Process S22, the execution place determining unit 32 of the management server 10 determines the dedicated execution place of the task as the temporary execution place of the task and ends the whole process illustrated in FIG. 18.

Accordingly, in a case where there is a dedicated execution place (a deployment-dedicated hypervisor in the case of the deployment) of the task, the process can be performed at the dedicated execution place, and accordingly, the allocation of resources of the other virtual servers 64 that are actually operated is not pressed. Accordingly, the degradation of the performance of the other virtual servers 64 that are actually operated can be suppressed. In addition, by setting a dedicated execution place (a hypervisor or a data store) having high performance as the temporary execution place, the resource managing operation relating to the task can be performed at higher speed.

In Process S23, the execution place determining unit 32 of the management server 10 lists candidates for the execution place that can be taken based on the configuration tables 23A, 23B, and 23C.

In Process S24, the execution place determining unit 32 of the management server 10 narrows down the candidates for the execution place that are listed in Process S23 to candidates for the execution place that can transit to the configuration of the current status based on the management table 24 and a physical connection table (not illustrated in the figure).

In Process S25, the execution place determining unit 32 of the management server 10 further narrows down the candidates to candidates for the execution place that can transit to the execution place at the time of completion.

In Process S26, the execution place determining unit 32 of the management server 10 predicts an estimated processing time for each of the candidates for the execution place, which have been narrowed down in Process S25, based on information of the simultaneous execution number and the processing load according to the time table 25 and the performance table 26.

In Process S27, the execution place determining unit 32 of the management server 10 sorts the candidates for the execution place in the descending order of the estimated processing time calculated in Process S26 and determines a candidate having a shortest processing time as the temporary execution place of the task. When Process S27 is completed, the execution place determining unit 32 of the management server 10 ends the whole process illustrated in FIG. 18.

In Process S27, the execution place determining unit 32 of the management server 10 determines the candidate having the shortest processing time. However, the present invention is not limited thereto, and the execution place determining unit 32 of the management server 10 may determine the execution place using another index. For example, the execution place determining unit 32 of the management server 10 may determine an execution place for averaging the simultaneous execution number of each hypervisor or each data store such that the execution places disperse as much as possible. Accordingly, the simultaneous execution numbers of the hypervisors and the data stores are averaged, and the delay of the process due to the queuing of the task is prevented, whereby the total processing time can be shortened.

Furthermore, the execution place determining unit 32 of the management server 10 may estimate the load of each execution place based on the performance information of each hypervisor or each data store and determine an execution place for averaging the loads. Accordingly, the execution place determining unit 32 of the management server 10 can average the CPU loads of physical servers in which the hypervisors operate or the network I/O loads or the disk I/O loads of the data stores.

An execution place may be determined so as to avoid the virtual server 64 that actually operates based on the actual operation flag field 23*g*. By selecting the execution place so as to avoid the virtual server 64 that actually operates, the resource managing operation such as the deployment of a new virtual server 64 can be performed without having adverse effect on the virtual server 64 that actually operates.

In addition, in a case where the operation is performed in a multi-tenant environment in which a plurality of users live together, not only a hypervisor inside the same tenant but also a vacant hypervisor of any other tenant may be selected. In such a case, unutilized assets of the whole data center are effectively used, and the resource use efficiency can be raised.

Figure 19:
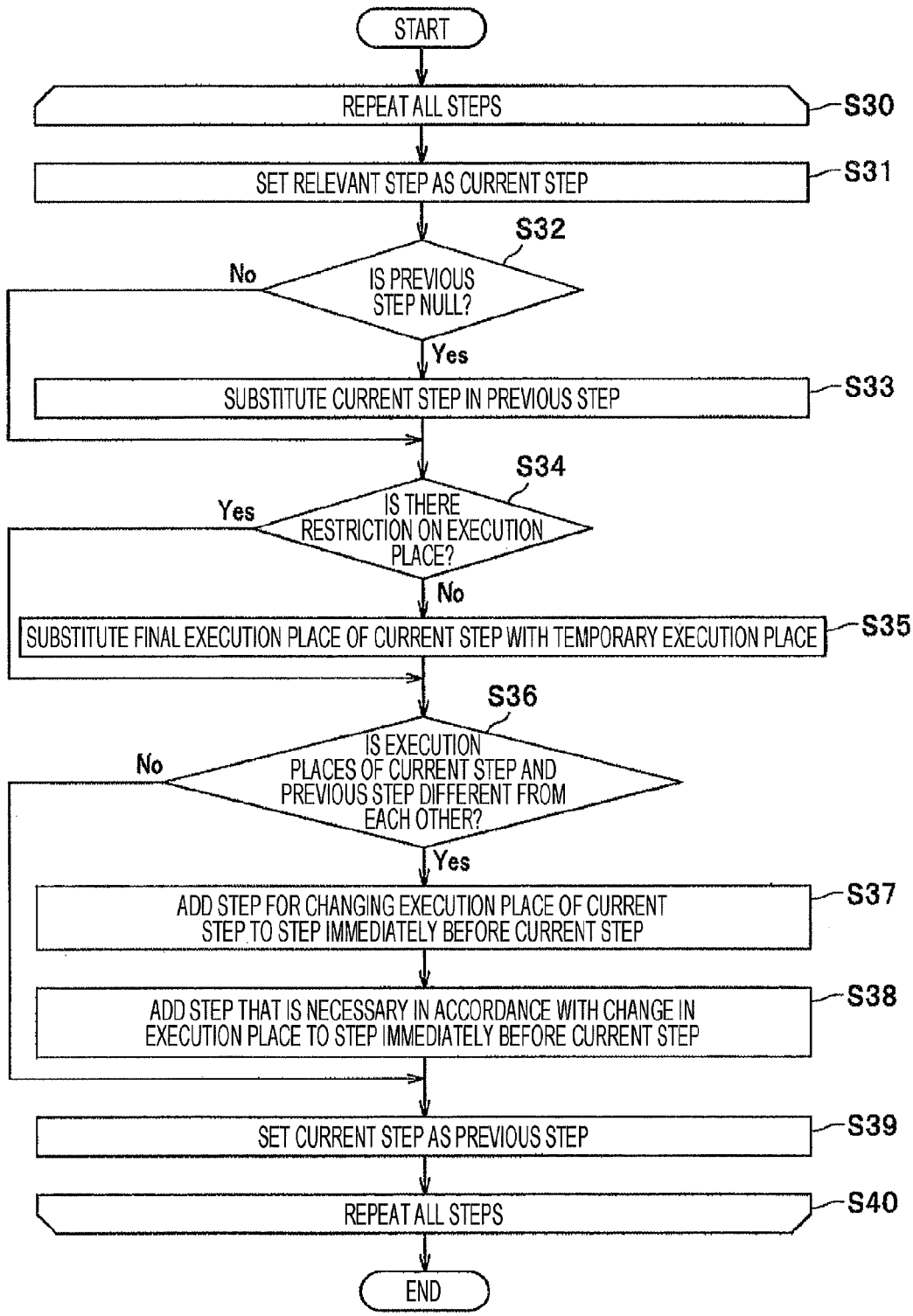
FIG. 19 is a flowchart that illustrates a step substitution process according to the first embodiment.

FIG. 19 is a flowchart that illustrates the step substitution process according to the first embodiment. All the process is performed by the scenario control unit 31 of the management server 10.

This corresponds to a flow, in which Process S15 is represented in detail, that is included in the whole flow (FIG. 17) described above and corresponds to a process in which the scenario control unit 31 performs the step substitution process of the task based on the correspondence table.

When the process is started, the scenario control unit 31 of the management server 10 sequentially repeats the process for all the steps added to the task table 28 in Processes S30 to S40. Hereinafter, a step that is in the middle of execution will be referred to as a "relevant step", and the step substitution process of a task (FIG. 19) is performed while comparing a variable "current step" and a variable "previous step" with each other. When the process is started, it is assumed that nothing is set in the "previous step", in other words, Null is set therein.

In Process S31, the scenario control unit 31 of the management server 10 sets the "relevant step" as the "current step".

In Process S32, the scenario control unit 31 of the management server 10 determines whether or not the "previous step" is Null. In a case where the "previous step" is Null (Yes), the scenario control unit 31 of the management server 10 performs Process S33. On the other hand, in a case where the "previous step" is not Null (No), the scenario control unit 31 of the management server 10 performs Process S34.

In Process S33, the scenario control unit 31 of the management server 10 substitutes the "previous step" with the "current step".

In Process S34, the scenario control unit 31 of the management server 10 determines whether or not there is a restriction on the execution place in the "relevant step". In a case where it is determined that there is a restriction on the execution place in the "relevant step" (Yes), the scenario control unit 31 of the management server 10 performs Process S36. On the other hand, in a case where it is determined that there is no restriction on the execution place in the "relevant step" (No), the scenario control unit 31 of the management server 10 performs Process S35. More specifically, in a case where "False" is stored in the network field 28*e*, the scenario control unit 31 of the management server 10 determines that there is no restriction on the execution place. On the other hand, in a case where "True" is stored in the network field 28*e*, the scenario control unit 31 of the management server 10 determines that there is a restriction on the execution place. Accordingly, in a case where the scenario control unit 31 of the management server 10 is connected to the guest OS 65 using Secure shell (SSH) or Windows Management Instrumentation (WMI) through the management network 100 and sets a setting item of the application to an environment-specific value, it can perform the process after moving to a place at which network communication with the management server 10 can be made. In addition, the scenario control unit 31 of the management server 10, after matching the setting of a database management system (DBMS) operating on a virtual server 64, which has been deployed in advance, and the application server operating on a virtual server 64 that is the target, causes the virtual servers to belong to the same business network 120 and can check the communication.

On the other hand, the scenario control unit 31 of the management server 10 can execute "the step for generating a virtual server from the virtual server template in the hypervisor and the data store" (FIG. 14) as the previous step in the scenario table 27A (FIG. 14) when a communication between the management server 10 and the hypervisor (or the console 66) is set up, and there is no restriction on the execution place. The scenario control unit 31 of the management server 10, after offloading and executing a process having high CPU load, high network I/O load, or high disk I/O load that is represented by, for example, the step for generating the virtual server 64 from the virtual server template 29 or the step for customizing the guest OS 65 on a hypervisor or a data store in which the other resources are vacant, can move the operation place of the virtual server 64 to a target execution place and perform a process having a restriction on the execution place that is represented by the communication checking or the like. By performing the process in such a sequence, the scenario control unit 31 of the management server 10 has an advantage of preventing the degradation of the performance without unnecessarily taking the resources from the other virtual servers 64 that actually operate.

In addition, when the scenario control unit 31 of the management server 10 executes a resource managing operation task of a multiple deployment requests or the like, the delay of the process due to queuing of the task based on the restriction on the simultaneous execution number of the hypervisor or the data store can be prevented, whereby the total processing time can be shortened.

In Process S35, the scenario control unit 31 of the management server 10 substitutes the final execution place of the "current step" with the temporary execution process.

In Process S36, the scenario control unit 31 of the management server 10 determines whether or not the execution place of the "current step" and the execution place of the "previous step" are different from each other. In a case where the execution place of the "current step" and the execution place of the "previous step" are different from each other (Yes), the scenario control unit 31 of the management server 10 performs Process S37. On the other hand, in a case where the execution place of the "current step" and the execution place of the "previous step" are not different from each other (No), the scenario control unit 31 of the management server 10 performs Process S39.

In Process S37, the scenario control unit 31 of the management server 10 adds a step for changing the execution place by referring to the additional scenario table 27B.

In Process S38, the scenario control unit 31 of the management server 10 adds a necessary step according to the change in the execution place to the place immediately before the "current step" by referring to the additional scenario table 27B.

In Process S39, the scenario control unit 31 of the management server 10 sets the "current step" as the "previous step".

In Process S40, the scenario control unit 31 of the management server 10 determines whether or not all the steps added to the task table 28 have been processed. In a case where all the steps added to the task table 28 have not been processed, the scenario control unit 31 of the management server 10 is returned to Process S30. On the other hand, in a case where all the steps added to the task table 28 have been processed, the scenario control unit 31 of the management server 10 ends the entire process illustrated in FIG. 19.

When a task configured by a series of steps for a predetermined execution place is received, the management server 10 changes the execution place of the step to the temporary execution place in accordance with Process S35, gives an instruction for executing the task at the temporary execution place in accordance with Process S37, then allows the virtual server to transit from the temporary execution place to the predetermined execution place, and can give an instruction for continuously executing the task at the predetermined execution place.

Advantage of First Embodiment

According to the first embodiment described above, there are advantages as the following (A) to (E).

(A) A total processing time for a process request of deployment (provisioning), power control, live migration, storage migration, or the like of multiple virtual servers can be shortened.

(B) By causing a dedicated physical server having high performance or a storage device having high performance to execute the above-described process request, the process request can be processed in a shorter time.

(C) By utilizing unutilized resources inside the data center, the above-described process request can be performed. Accordingly, the unutilized resources can be effectively used.

(D) After a process having high CPU load, high network I/O load, or high disk I/O load is offloaded and executed on a hypervisor or a data store in which the other resources are vacant, the operation place of the virtual server is moved to a target execution place, and a process having a restriction on the execution place that is represented by the communication checking can be performed. By performing the process in such a sequence, the degradation of the performance can be prevented without taking resources from the other virtual servers that actually operate.

(E) When a resource managing operation task of multiple deployment requests or the like is executed, the delay of the process due to queuing of the task based on the restriction on the simultaneous execution number of the hypervisor or the data store can be prevented, whereby the total processing time can be shortened.

Configuration of Second Embodiment

FIG. 20 is a diagram that illustrates an example of an additional scenario table according to a second embodiment. The same reference sign is assigned to the same element as that of the additional scenario table 27B according to the first embodiment illustrated in FIG. 15.

The additional scenario table 27C according to the second embodiment includes the same fields as those of the additional scenario table 27B according to the first embodiment.

In the additional scenario table 27C according to the second embodiment, the step field 27i at the time when "data store p=data store q" in the condition field 27g is different from the step field 27i of the additional scenario table 27B according to the first embodiment, and the following series of steps are stored.

Generate Port Group p in Hypervisor p
Generate Second Virtual Server from Template p in Hypervisor p and Data Store p
Switch to Disk File of Second Virtual Server and Switch to Disk Image File of Generated Virtual Server Operation of Second Embodiment When the data store of the temporary execution place and the data store of the final execution place are different from each other, a scenario control unit 31 of the management server 10 according to the second embodiment switches the disk image file of the generated virtual server 64 instead of connecting the generated virtual server 64 to the port group p of the final execution place. Accordingly, even when the scenario control unit 31 of the management server 10 does not correct the connection of the port group p, the generated virtual server 64 can be used.

Advantage of Second Embodiment

According to the second embodiment described above, there is an advantage as the following (F).

(F) The scenario control unit 31 of the management server 10 switches to the disk image file of the generated virtual server 64. Accordingly, the generated virtual server 64 can be used without correcting the connection of the port group p.

Modified Example

The present invention is not limited to the above-described embodiments, and changes can be made therein in a range not departing from the concept of the present invention. As such use forms or modified example, for example, there are the following (a) and (b).

(a) In the first embodiment, the execution place of the scenario is designated by a user in advance. However, the present invention is not limited thereto, and the execution place may be an execution place that is determined first by the system. In addition, the user's designation or the designation of the execution place determined first by the system may be group designation in which a plurality of execution places are included. In such a case, in consideration of the simultaneous execution number or the performance status of each execution place, the scenario control unit 31 selects an execution place among the group that has a shortest processing time or does not have adverse effect on the other virtual servers 64, and executes the scenario.

(b) In the first embodiment, the same data store A is set as the execution place. However, the present invention is not limited thereto, but another data store may be set as the execution place. In such a case, the network I/O load and the disk I/O load relating to the data store are distributed, and the influence on the virtual server 64 that actually operates on the same data store can be suppressed.

What is claimed is:

1. A method of processing and controlling a virtual server that is performed by a management server for a hypervisor that can operate the virtual server, wherein
the hypervisor operates on one physical server,
the virtual server operates in accordance with a file image on one data store, and
the management server:
when instructed to execute a task that is configured by a series of steps for a predetermined execution place, gives an instruction for changing the execution place of the steps to a temporary execution place and executing the task and, after the execution at the temporary execution place, causes the virtual server to transit from the temporary execution place to the predetermined execution place, and gives an instruction for continuously executing the task at the predetermined execution place, wherein the execution place is any of a place of one hypervisor, a place of one data store, and a place of a combination of one hypervisor and one data store,
when there is no restriction on the execution place of the steps and load or a simultaneous execution number of the hypervisor configuring the predetermined execution place is detected to exceed a predetermined threshold, changes the execution place of the steps to the temporary execution place and instructs the hypervisor configuring the temporary execution place to execute the steps,
when there is a restriction on the execution place of the steps and load or a simultaneous execution number of the hypervisor configuring the predetermined execution place is detected not to exceed the predetermined threshold, instructs the hypervisor configuring the predetermined execution place to execute the steps.

2. The method according to claim 1, wherein the management server gives an instruction for changing the execution place of the steps to a temporary execution place and executing the steps in a case where there is no restriction on the execution place of the steps and instructs the hypervisor configuring the predetermined execution place to execute the steps in a case where there is a restriction on the execution place of the steps.

3. The method according to claim 1, wherein
the management server configures the temporary execution place by using a hypervisor that is determined in advance and a hypervisor of which the load or the simultaneous execution number of the task is the predetermined threshold or less.

4. The method according to claim 3, wherein the task includes any of:

moving the virtual server operating on a predetermined data store to a second data store other than the predetermined data store;
moving the virtual server operating on the hypervisor that configures the predetermined execution place to a second hypervisor other than the hypervisor that configures the predetermined execution place;
managing power-on, power-off, or shutdown of the virtual server; and
deploying the virtual server.

5. The method according to claim 4, wherein, when the execution place of a previous step and the execution place of a current step are different from each other in the task, the management server gives an instruction for executing a step moving a process result of the previous step and executing a step accompanied with the moving of the process result and then gives an instruction for executing the current step.

6. The method according to claim 5, wherein
the task generates a predetermined virtual server operating on the hypervisor that configures the predetermined execution place,
the step moving the process result of the previous step includes moving the generated predetermined virtual server to the predetermined execution place, and
the step accompanied with the moving of the process result includes connecting the generated predetermined virtual server to a predetermined port group of the hypervisor that configures the predetermined execution place.

7. The method according to claim 5, wherein,
when giving an instruction for changing the execution place of the steps to the temporary execution place and executing the steps, the management server stores predetermined correspondence information between the hypervisor that configures the predetermined execution place and a hypervisor that configures the temporary execution place, and
the step of moving the process result of the previous step includes moving the process result of the previous step to the predetermined execution place in accordance with the predetermined correspondence information.

8. A virtual server processing control system comprising:
a management server;
a hypervisor that can operate a virtual server; and
a data store, wherein
the hypervisor operates and is stored in a memory on one physical server,
the virtual server operates in accordance with a file image on one data store, and
the management server:
when instructed to execute a task that is configured by a series of steps for a predetermined execution place, changes the execution place of the steps to a temporary execution place and gives an instruction for executing the task and, after the execution at the temporary execution place, causes the virtual server to transit from the temporary execution place to the predetermined execution place and gives an instruction for continuously executing the task at the predetermined execution place, wherein the execution place is any of a place of one hypervisor, a place of one data store, and a place of a combination of one hypervisor and one data store,
when there is no restriction on the execution place of the steps and load or a simultaneous execution number of the hypervisor configuring the predetermined execution place is detected to exceed a predetermined threshold, changes the execution place of the steps to the temporary execution place and instructs the hypervisor configuring the temporary execution place to execute the steps, when there is a restriction on the execution place of the steps and load or a simultaneous execution number of the hypervisor configuring the predetermined execution place is detected not to exceed the predetermined threshold, instructs the hypervisor configuring the predetermined execution place to execute the steps.

9. The virtual server processing control system according to claim 8, wherein the management server gives an instruction for changing the execution place of the steps to a temporary execution place and executing the steps in a case where there is no restriction on the execution place of the steps and instructs a hypervisor configuring the predetermined execution place to execute the steps in a case where there is a restriction on the execution place of the steps.

10. A virtual server processing control management server that manages a hypervisor that can operate a virtual server and a data store, wherein the hypervisor operates and is stored in a memory on one physical server, the virtual server operates in accordance with a file image on one data store, and the virtual server processing control management server:

when instructed to execute a task that is configured by a series of steps for a predetermined execution place, changes the execution place of the steps to a temporary execution place and gives an instruction for executing the task and, after the execution at the temporary execution place, causes the virtual server to transit from the temporary execution place to the predetermined execution place and gives an instruction for continuously executing the task at the predetermined execution place, wherein the execution place of the steps is any of a place of one hypervisor, a place of one data store, and a place of a combination of one hypervisor and one data store, when there is no restriction on the execution place of the steps and load or a simultaneous execution number of the hypervisor configuring the predetermined execution place is detected to exceed a predetermined threshold, changes the execution place of the steps to the temporary execution place and instructs the hypervisor configuring the temporary execution place to execute the steps, when there is a restriction on the execution place of the steps and load or a simultaneous execution number of the hypervisor configuring the predetermined execution place is detected not to exceed the predetermined threshold, instructs the hypervisor configuring the predetermined execution place to execute the steps.

* * * * *